(12) United States Patent
Weston et al.

(10) Patent No.: US 12,319,341 B2
(45) Date of Patent: Jun. 3, 2025

(54) METHODS AND APPARATUS TO CONTROL A VEHICLE TRAILER USING TORQUE VECTORING

(71) Applicant: Ford Global Technologies, LLC, Dearborn, MI (US)

(72) Inventors: Keith Weston, Canton, MI (US); Lorne Forsythe, Novi, MI (US); Brendan Diamond, Grosse Pointe, MI (US); Andrew Denis Lewandowski, Sterling Heights, MI (US); Michael Alan McNees, Flat Rock, MI (US); Jordan Barrett, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 744 days.

(21) Appl. No.: 17/568,545

(22) Filed: Jan. 4, 2022

(65) Prior Publication Data

US 2023/0249746 A1 Aug. 10, 2023

(51) Int. Cl.
*B62D 13/00* (2006.01)
*B60W 30/095* (2012.01)
(Continued)

(52) U.S. Cl.
CPC ......... *B62D 13/02* (2013.01); *B60W 30/0953* (2013.01); *B60W 30/0956* (2013.01); *B60W 50/14* (2013.01); *B62D 13/04* (2013.01); *B60W 2050/146* (2013.01); *B60W 2300/14* (2013.01); *B60W 2420/403* (2013.01)

(58) Field of Classification Search
CPC ........ B62D 13/02; B62D 13/04; B62D 13/00; B60W 30/0953; B60W 30/0956; B60W 50/14; B60W 2050/146; B60W 2300/14; B60W 2420/403; B60W 30/045; B60W 2530/207; B60W 30/09; B60W 30/18145; B60W 2540/18; B60W 2554/00; B60W 2554/802

See application file for complete search history.

(56) References Cited

U.S. PATENT DOCUMENTS

| 7,743,859 | B2 | 6/2010 | Forsyth |
| 2007/0193795 | A1* | 8/2007 | Forsyth ................... B60L 50/50 180/65.285 |

(Continued)

FOREIGN PATENT DOCUMENTS

| DE | 102010019480 A1 * | 11/2011 | ............. B62D 13/06 |
| DE | 102019202781 | 7/2020 | |
| WO | 2010146497 | 12/2010 | |

*Primary Examiner* — Justin Holmes
(74) *Attorney, Agent, or Firm* — Hanley, Flight & Zimmerman, LLC; Lorne Forsythe

(57) ABSTRACT

Methods and apparatus to control a vehicle trailer using torque vectoring are disclosed. An example apparatus to control a trailer of a vehicle includes condition determination circuitry to determine, based on data from sensors on at least one of the trailer or the vehicle, whether a condition associated with the vehicle is satisfied, and torque control circuitry to adjust, in response to the condition being satisfied, a first torque of a first motor and a second torque of a second motor, the first motor operatively coupled to a first wheel of the trailer, the second motor operatively coupled to a second wheel of the trailer.

17 Claims, 14 Drawing Sheets

(51) Int. Cl.
*B60W 50/14* (2020.01)
*B62D 13/02* (2006.01)
*B62D 13/04* (2006.01)

(56) References Cited

U.S. PATENT DOCUMENTS

2013/0079979 A1* 3/2013 Sheidler ................. B62D 59/04
                                                  180/14.2
2016/0318493 A1* 11/2016 Drako ..................... B60T 8/248
2020/0391562 A1   12/2020 Abdel-Rahman et al.
2022/0194378 A1*  6/2022 Sullivan .................... B60L 7/24

* cited by examiner

METHODS AND APPARATUS TO CONTROL A VEHICLE TRAILER USING TORQUE VECTORING

FIELD OF THE DISCLOSURE

This disclosure relates generally to vehicles and, more particularly, to methods and apparatus to control a vehicle trailer using torque vectoring.

BACKGROUND

A trailer can be coupled to a vehicle to increase a towing capacity of the vehicle. In some cases, a combination of the vehicle and the trailer can have different steering and/or maneuvering capabilities compared to the vehicle alone. The trailer can be controlled separately from the vehicle to improve maneuverability of the vehicle.

SUMMARY

An example apparatus to control a trailer of a vehicle is disclosed. The example apparatus includes condition determination circuitry to determine, based on data from sensors on at least one of the trailer or the vehicle, whether a condition associated with the vehicle is satisfied, and torque control circuitry to adjust, in response to the condition being satisfied, a first torque of a first motor and a second torque of a second motor. The first motor is operatively coupled to a first wheel of the trailer, and the second motor is operatively coupled to a second wheel of the trailer.

An example non-transitory computer readable medium disclosed herein includes instructions that, when executed, cause processor circuitry to determine, based on data from sensors on at least one of a trailer or a vehicle, whether a condition associated with the vehicle is satisfied, and adjust, in response to the condition being satisfied, a first torque of a first motor and a second torque of a second motor. The first motor is operatively coupled to a first wheel of the trailer, and the second motor is operatively coupled to a second wheel of the trailer.

An example apparatus disclosed herein includes memory, instructions, and processor circuitry to execute the instructions to determine, based on data from sensors on at least one of a trailer or a vehicle, whether a condition associated with the vehicle is satisfied, and adjust, in response to the condition being satisfied, a first torque of a first motor and a second torque of a second motor. The first motor is operatively coupled to a first wheel of the trailer, and the second motor is operatively coupled to a second wheel of the trailer.

Figure 1A:
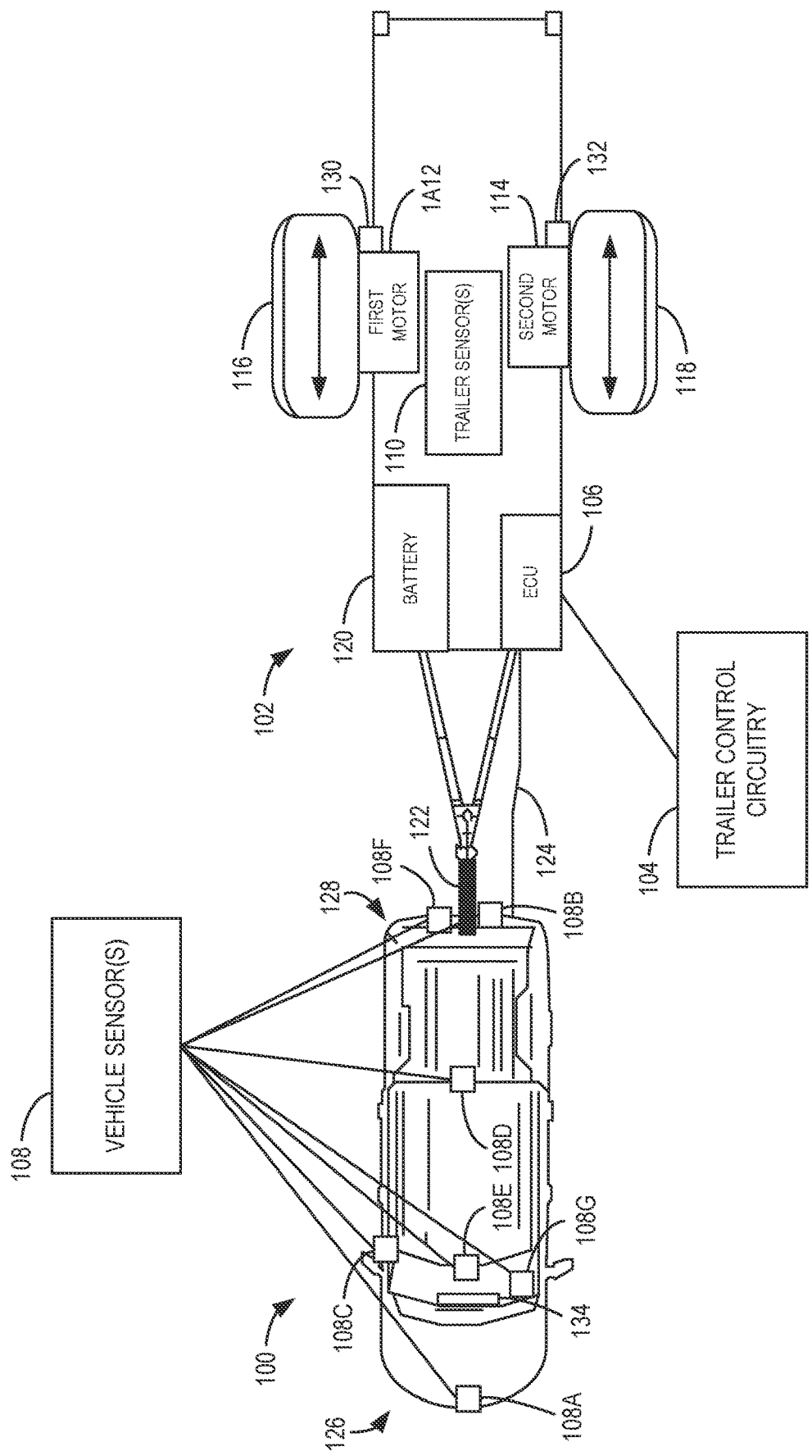
FIG. 1A illustrates an example vehicle and an example trailer implementing example trailer control circuitry in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time+/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

A trailer can be coupled to a vehicle to increase a towing capacity of the vehicle. The trailer is commonly coupled to the vehicle at an attachment point on a tongue of the vehicle. During vehicle travel, the trailer can pivot and/or rotate relative to the vehicle about the attachment point to enable turning of the vehicle and the trailer. In some cases, external forces (e.g., wind on a side of the trailer, uneven terrain, etc.) may cause the trailer to unintentionally pivot relative to the vehicle, thus resulting in instability and/or sway of the trailer. The trailer may also experience instability, oversteering, and/or understeering in response to sudden and/or sharp turns of the vehicle (e.g., to avoid an obstacle in a projected path of the vehicle). In some cases, instability and/or sway of the trailer may reduce an operator's ability to accurately steer the vehicle along a desired path.

Furthermore, in some cases, the trailer can become disconnected from the vehicle during travel. In such cases, the operator of the vehicle can pull the vehicle over to the side of the road, where the trailer can be reattached to the vehicle. Safety chains are used to maintain connection between the trailer and the vehicle when the trailer is detached from the tongue attachment point. However, slack in the safety chains may cause the trailer to swerve and/or sway relative to the vehicle, thus reducing the operator's ability to control the trailer during vehicle travel. As such, appropriate tension in the safety chains is required while pulling the trailer and the vehicle to the side of the road.

Examples disclosed herein improve maneuverability of a vehicle and trailer by controlling the trailer using torque vectoring. In examples disclosed herein, example processor circuitry detects, based on sensor data, whether one or more conditions of the trailer and/or the vehicle is/are satisfied. In some examples, the conditions indicate instability and/or sway of the trailer, disconnection of the trailer from the vehicle, presence of an obstacle in a projected path of the vehicle, etc. For example, the processor circuitry can detect that sway and/or instability of the trailer is present based on camera image data indicating that the trailer is moving relative to the vehicle. In another example, the processor circuitry monitors a tongue weight of the trailer on a tongue of the vehicle, and determines that the trailer is disconnected from the vehicle when the tongue weight is below a threshold. In other examples, the processor circuitry detects an obstacle in a projected path of the vehicle based on image data from a forward-facing camera of the vehicle.

In examples disclosed herein, in response to determining that at least one of the conditions is satisfied, the processor circuitry controls one or more motors operatively coupled to wheels of the trailer. For example, the processor circuitry adjusts a first torque for a first motor operatively coupled to a first wheel of the trailer and adjusts a second torque for a second motor operatively coupled to a second wheel of the trailer. In some examples, when the condition indicates instability of the trailer, the processor circuitry adjusts the first and second torques to stabilize and/or reduce sway of the trailer. In other examples, when the conditions indicate that the trailer is disconnected from the vehicle, the processor circuitry adjusts the first and second torques to maintain tension in the safety chains and/or cause the trailer to follow the vehicle to the side of the road. In some examples, when the condition indicates that an obstacle is in the projected path of the vehicle, the processor circuitry adjusts the first and second torques to swerve the trailer away from and/or steer the trailer around the obstacle.

In some examples, multiple motors are implemented on the trailer, where each of the multiple motors controls a respective wheel of the trailer. In other examples, the trailer includes one or more wheel axles, and at least one motor is associated with a respective wheel axle. In such examples, the at least one motor is operatively coupled to a mechanical differential gearbox that enables torque vectoring of the wheels on the wheel axle. For example, the mechanical differential gearbox enables the at least one motor to individually control a direction and/or speed of rotation of the wheels on the wheel axle. In some examples, different combinations of motors and/or gearboxes can be implemented on the trailer based on the number of wheels on the trailer and/or the amount of space available on the trailer.

Advantageously, examples disclosed herein improve maneuverability and stability of a vehicle and trailer by actively controlling travel of the trailer using torque vectoring. Examples disclosed herein can use existing sensors of the trailer and/or the vehicle to detect a condition of the vehicle. By automatically adjusting motor torque based on the detected condition of the vehicle and/or the trailer, examples disclosed herein reduce sway of the trailer and/or avoid obstacles in a path of the vehicle. As such, examples disclosed herein improve user experience for an operator of the vehicle by mitigating difficult driving conditions.

FIG. 1A illustrates an example vehicle 100 and an example trailer 102 implementing example trailer control circuitry 104 in accordance with teachings of this disclosure. In the illustrated example of FIG. 1A, the trailer control circuitry 104 is implemented by an example electronic control unit (ECU) 106 on the trailer 102. In this example, the trailer control circuitry 104 and/or the ECU 106 are electrically and/or communicatively coupled to one or more example vehicle sensors 108 implemented on the vehicle 100 and/or one or more example trailer sensors 110 implemented on the trailer 102. The trailer control circuitry 104 is further electrically and/or operatively coupled to a first example motor 112 and a second example motor 114. In this example, the first motor 112 is operatively coupled to a first example wheel 116 of the trailer 102 and the second motor 114 is operatively coupled to a second example wheel 118 of the trailer 102. In this example, the ECU 106, the trailer sensors 110, the first motor 112, and/or the second motor 114 are powered by an example battery 120 onboard the trailer 102.

In the illustrated example of FIG. 1A, the trailer 102 is coupled to the vehicle 100 at an example tongue 122 of the vehicle 100. Additionally, an example trailer harness (e.g., wiring connector) 124 is coupled between the vehicle 100 and the trailer 102. In some examples, the trailer harness 124 electrically couples electronics (e.g., the vehicle sensors 108) of the vehicle 100 to the ECU 106 such that information can be communicated therebetween.

In the illustrated example of FIG. 1A, the vehicle sensors 108 include an example front camera (e.g., a forward-facing camera) 108A, an example rear camera (e.g., rear-facing camera, a backup camera) 108B, an example blind spot information system (BLIS) sensor 108C, an example ultrasonic sensor 108D, an example LiDAR sensor 108E, an example tongue weight sensor (e.g., a load sensor) 108F, and an example steering wheel sensor 108G. In some examples, one or more other sensors (e.g., a radar sensor, a 360-degree camera, etc.) may be used in addition to or instead of the vehicle sensors 108 shown in FIG. 1A.

In this example, the vehicle sensors 108 and/or the trailer sensors 110 are configured to send data (e.g., sensor data) to the trailer control circuitry 104 for detecting a condition associated with the vehicle 100. For example, the front camera 108A and the rear camera 108B capture and send image data associated with an example front end 126 and an example rear end 128, respectively, of the vehicle 100. In this example, the front camera 108A captures images of a projected path of the vehicle 100. In some examples, the BLIS sensor 108C, the ultrasonic sensor 108D, and/or the LiDAR sensor 108E gather data associated with an environment surrounding the vehicle 100. In some examples, the trailer control circuitry 104 determines locations of one or more obstacles surrounding the vehicle 100 based on the data from the front camera 108A, the BLIS sensor 108C, the ultrasonic sensor 108D, and/or the LiDAR sensor 108E.

In the illustrated example of FIG. 1A, the trailer control circuitry 104 determines a condition of the trailer 102 based on the data from the vehicle sensors 108 and/or the trailer sensors 110. For example, the tongue weight sensor 108F measures a weight (e.g., a tongue weight) of the trailer 102 on the tongue 122 of the vehicle 100, where the tongue weight sensor 108F is a strain gauge sensor is some examples. Furthermore, the rear camera 108B captures images of the trailer 102 relative to the vehicle 100. In some examples, the trailer control circuitry 104 determines whether the trailer 102 is disconnected from the vehicle 100 based on the tongue weight and/or the images of the trailer 102. For example, the trailer control circuitry 104 determines that the trailer 102 is disconnected in response to the tongue weight being at or below a threshold weight (e.g., 0 pounds (lb)) and/or the images indicating that a distance between the vehicle 100 and the trailer 102 is greater than a threshold distance (e.g., 5 feet (ft)).

Additionally or alternatively, the trailer control circuitry 104 identifies sway and/or instability of the trailer 102 based on the data from the trailer sensors 110. In this example, the trailer sensors 110 include at least one of a yaw sensor, a roll sensor, a lateral acceleration sensor, a longitudinal acceleration sensor, a wheel speed sensor, a slope sensor, or one or more trailer cameras. In some examples, the trailer control circuitry 104 determines that the trailer 102 is swaying relative to the vehicle 100 in response to determining, based on data from the yaw sensor, the roll sensor, and/or the one or more trailer cameras, that an angle of the trailer 102 relative to the vehicle 100 is greater than a threshold angle when the vehicle 100 is travelling forward along a straight path.

In some examples, the slope sensor measures a slope of the trailer 102 in a longitudinal direction of the trailer 102. Typically, when the trailer 102 is connected to the vehicle 100, the trailer 102 is substantially horizontal and/or parallel to the ground. In contrast, when disconnected from the vehicle 100, the trailer 102 may slope downward at a front end or rear end of the trailer 102. As such, the trailer control circuitry 104 can determine that the trailer 102 is disconnected from the vehicle in response to detecting, based on data from the slope sensor, a change in slope of the trailer 102.

In the illustrated example of FIG. 1A, when the trailer control circuitry 104 detects a condition of the vehicle 100 and/or the trailer 102 (e.g., an obstacle in the projected path of the vehicle 100, disconnection of the trailer 102 from the vehicle 100, instability and/or sway of the trailer 102, etc.), the trailer control circuitry 104 controls the first and second motors 112, 114 to control the trailer 102 using torque vectoring. In some examples, the trailer control circuitry 104 can adjust the first and second torques of the first and second motors 112, 114, respectively, to steer and/or swerve the trailer 102 around a detected object. In some examples, the trailer control circuitry 104 can adjust the first and second torques to reduce sway of the trailer 102 and/or cause the trailer 102 to follow the vehicle 100 when the trailer 102 is disconnected therefrom. In some examples, the trailer control circuitry 104 controls a first example brake 130 of the first wheel 116 and a second example brake 132 of the second wheel 118 to further steer the trailer 102. For example, the trailer control circuitry 104 can use the first and second brakes 130, 132 in addition to or instead of the first and second motors 112, 114 to control the steering of the trailer 102.

In the illustrated example of FIG. 1A, the vehicle 100 includes an example user interface 134 to display instructions and/or indications to the operator of the vehicle 100. In some examples, the user interface 134 is communicatively coupled to the trailer control circuitry 104. The trailer control circuitry 104, in response to detecting a condition of the vehicle 100 and/or the trailer 102, causes the user interface 134 to display an indication (e.g., a warning) to the operator that the condition has been detected. In some examples, the trailer control circuitry 104 causes the user interface 134 to display instructions to the operator. For example, in response to determining that the trailer 102 is disconnected from the vehicle 100, the trailer control circuitry 104 causes the user interface 134 to generate a visual and/or verbal instruction to the operator to stop and/or steer the vehicle 100 to the side of the road.

In some examples, the trailer control circuitry 104 obtains user input from the operator of the vehicle 100 via the user interface 134. In such examples, the trailer control circuitry 104 adjusts the first and second torques of the first and second motors 112, 114 based on the user input. For example, the user input may indicate that the vehicle 100 is to perform a crab walk. In such examples, the trailer control circuitry 104 controls the trailer 102 to follow the vehicle 100 in crab walk mode. In other examples, the operator can direct the trailer control circuitry 104, via the user interface 134, to reduce a turn radius of the trailer 102 by adjusting the first and second torques.

Figure 1B:
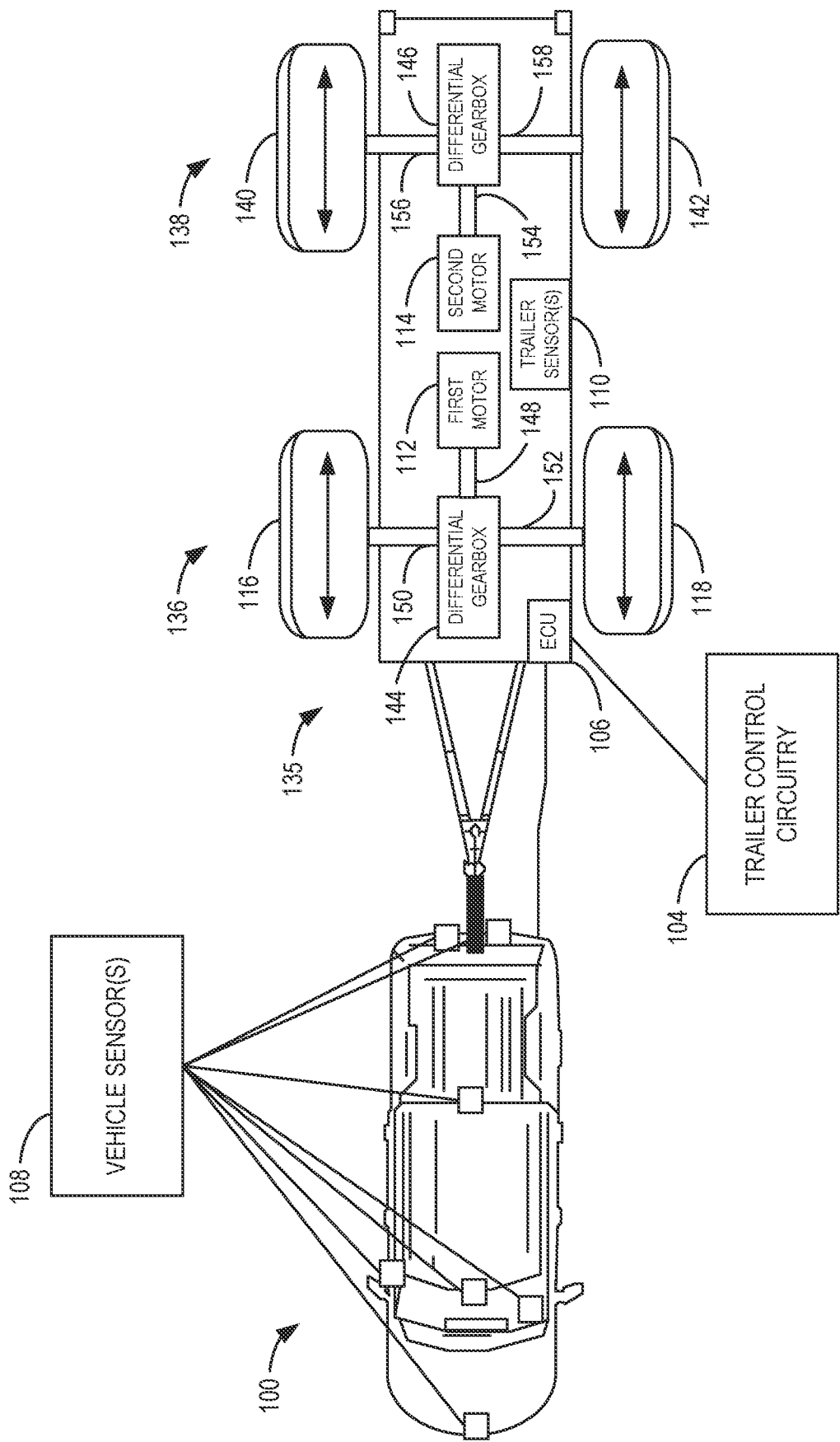
FIG. 1B illustrates the example vehicle of FIG. 1A and an example two-axle trailer.

FIG. 1B illustrates the example vehicle 100 of FIG. 1A and an example two-axle trailer 135. In the illustrated example of FIG. 1B, the two-axle trailer 135 includes a first example wheel axle 136 and a second example wheel axle 138. In this example, the first wheel axle 136 includes the first wheel 116 and the second wheel 118, and the second axle 138 includes an example third wheel 140 and an example fourth wheel 142. While two of the wheel axles 136, 138 are implemented on the two-axle trailer 135 in this example, a different number of the wheel axles 136, 138 can be used instead.

In the illustrated example of FIG. 1B, a first example gearbox (e.g., a first mechanical differential gearbox) 144 is operatively coupled to the first wheel axle 136, and a second example gearbox (e.g., a second mechanical differential gearbox) 146 is operatively coupled to the second wheel axle 138. In this example, the first motor 112 is operatively coupled to the first gearbox 144 to control the first and second wheels 116, 118, and the second motor 114 is operatively coupled to the second gearbox 146 to control the third and fourth wheels 140, 142. In some examples, the first and second gearboxes 144, 146 enable the first and second motors 114, 116 to independently control a speed and/or direction of rotation of the respective wheels 116, 118, 140, 142.

In one example, when the first motor 112 operates and/or rotates in a first direction, rotation of the first motor 112 is transmitted to the first gearbox 144 via a first example power coupler 148 coupled therebetween. In this example, the first gearbox 144 converts rotation of the first motor 112 in the first direction into forward rotation of an example first shaft 150 operatively coupled to the first wheel 116 and rearward rotation of an example second shaft 152 operatively coupled to the second wheel 118. In such an example, forward rotation of the first shaft 150 further causes corresponding forward rotation of the first wheel 116, and rearward rotation of the second shaft 152 further causes corresponding rearward rotation of the second wheel 118. Conversely, when the first motor 112 operates and/or rotates in a second direction opposite the first direction, the first gearbox 144 causes rearward rotation of the first shaft 150 and, thus, the first wheel 116, and causes forward rotation of the second shaft 152 and, thus, the second wheel 118.

Similarly, a second example power coupler 154 is coupled between the second motor 114 and the second gearbox 146, a third example shaft 156 is operatively coupled between the second gearbox 146 and the third wheel 140, and a fourth example shaft 158 is operatively coupled between the second gearbox 146 and the fourth wheel 142. As such, when the second motor 114 operates and/or rotates in the first direction, the second gearbox 146 causes forward rotation of the third shaft 156 and the third wheel 140, and causes rearward rotation of the fourth shaft 158 and the fourth wheel 142. Conversely, when the second motor 114 operates and/or rotates in the second direction, the second gearbox 146 causes rearward rotation of the third shaft 156 and the third wheel 140, and causes forward rotation of the fourth shaft 158 and the fourth wheel 142. In some examples, rotation speed of the first and second wheels 116, 118 is based on the rotation speed of the first motor 112, and rotation speed of the third and fourth wheels 140, 142 is based on the rotation speed of the second motor 114. Similar to the illustrated example of FIG. 1A, the trailer control circuitry 104 of FIG. 1B adjusts the speed of rotation and/or the direction of rotation of the first and second motors 112, 114 based on data from the vehicle sensors 108 and/or the trailer sensors 110.

In contrast to the trailer 102 in the illustrated example of FIG. 1A, the two-axle trailer 135 of FIG. 1B is steered using the gearboxes 144, 146 and respective ones of the motors 112, 114. In other examples, as shown in the illustrated example of FIG. 1A, each of the wheels 116, 118, 140, 142 can be electrically controlled via a respective motor (e.g., an electric motor) operatively coupled thereto. In some examples, a different number and/or combination of gearboxes and/or motors can be implemented on the two-axle trailer 135 based on available space in the two-axle trailer 135.

Figure 2:
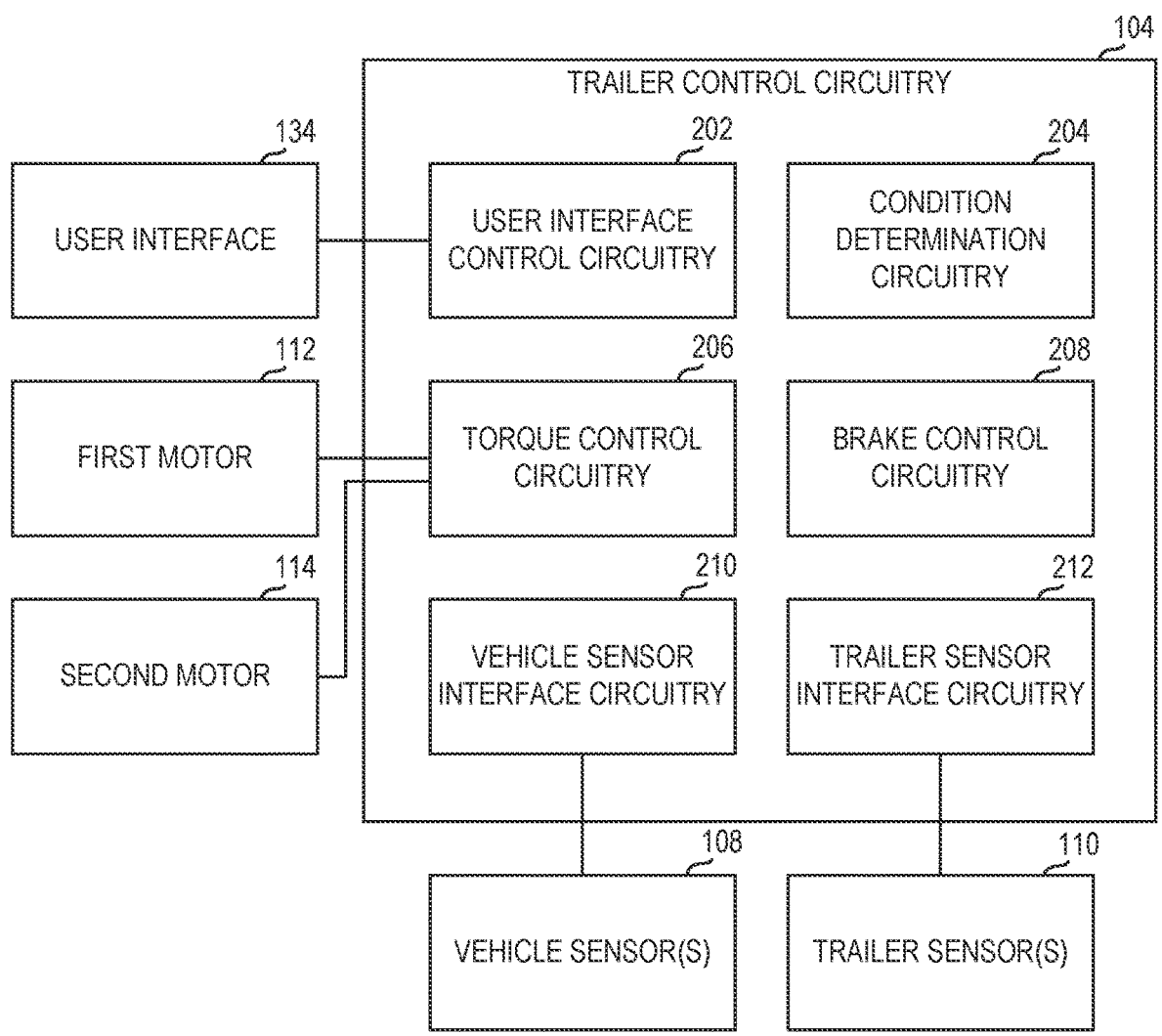
FIG. 2 is a block diagram of the example trailer control circuitry of FIG. 1A.

FIG. 2 is a block diagram of the example trailer control circuitry 104 of FIG. 1A. In the illustrated example of FIG. 2, the trailer control circuitry 104 includes example user interface control circuitry 202 communicatively and/or operatively coupled to the user interface 134, example condition determination circuitry 204, example torque control circuitry 206 operatively coupled to the first and second motors 112, 114, example brake control circuitry 208, example vehicle sensor interface circuitry 210 communicatively coupled to the vehicle sensors 108, and example trailer sensor interface circuitry 212 communicatively coupled to the trailer sensors 110.

In the illustrated example of FIG. 2, the vehicle sensor interface circuitry 210 obtains vehicle sensor data from the vehicle sensors 108. For example, the vehicle sensor interface circuitry 210 obtains first image data from the front camera 108A of the vehicle 100 of FIG. 1A, where the first image data represents a forward-facing view of a projected path of the vehicle 100. The vehicle sensor interface circuitry 210 also obtains second image data from the rear camera 108B of FIG. 1A, where the second image data represents a rearward-facing view of the trailer 102 from the vehicle 100. In some examples, the vehicle sensor interface circuitry 210 obtains additional vehicle data from the BLIS sensor 108C, the ultrasonic sensor 108D, and/or the LiDAR sensor 108E of FIG. 1A, where the vehicle data can identify physical features (e.g., other vehicles, objects) in an environment surrounding the vehicle 100. In this example, the vehicle sensor interface circuitry 210 obtains tongue weight data from the tongue weight sensor 108F of FIG. 1A, where the tongue weight data indicates a weight of the trailer 102 on the tongue 122 of the vehicle 100. In some other examples, the vehicle sensor interface circuitry 210 obtains steering wheel data from the steering wheel sensor 108G implemented on a steering wheel of the vehicle 100, where the steering wheel data represents a steering angle of the steering wheel and/or a torque applied to the steering wheel by an operator of the vehicle 100.

In the illustrated example of FIG. 2, the trailer sensor interface circuitry 212 obtains trailer sensor data from the trailer sensors 110. For example, the trailer sensor interface circuitry 212 obtains trailer image data from one or more trailer cameras implemented on the trailer 102. In some examples, the trailer sensor interface circuitry 212 obtains yaw angle data and/or yaw rate data from a yaw sensor of the trailer 102, and/or obtains roll angle data and/or roll rate data from a roll sensor of the trailer 102. Furthermore, the trailer sensor interface circuitry 212 obtains lateral acceleration data from a lateral acceleration sensor and longitudinal acceleration data from a longitudinal acceleration sensor on trailer 102, where the lateral and longitudinal accelerations are used for determining a g-force on the trailer 102 during turning of the trailer 102.

In the illustrated example of FIG. 2, the user interface control circuitry 202 controls a display of the user interface 134 and/or obtains user input therefrom. For example, the operator of the vehicle 100 can provide the user input via the user interface 134, where the user input can indicate a desired condition of the vehicle 100 and/or the trailer 102. For example, the operator can select a mode of operation for at least one of the vehicle 100 or the trailer 102. In some examples, the mode of operation can include one of a crab walk mode, a reduced turning radius mode, a sway control mode, or a trailer chain tensioning mode.

In some examples, the user interface control circuitry 202 can indicate a condition of the vehicle 100 and/or the trailer 102 on a display of the user interface 134. For example, the user interface control circuitry 202 can cause the user interface 134 to display the mode of operation selected by the operator. In other examples, the user interface control circuitry 202 can cause the user interface 134 to indicate a detected condition of the vehicle 100 and/or the trailer 102. For example, the detected condition can include instability and/or sway of the trailer 102, an object in a projected path of the vehicle 100, disconnection of the trailer 102 from the vehicle 100, etc. Additionally, in some examples, the user interface control circuitry 202 can cause the user interface 134 to provide instructions to the operator in response to a detected condition. For example, when the trailer 102 is disconnected from the vehicle 100, the user interface control circuitry 202 causes the user interface 134 to instruct the operator (e.g., via written and/or audio instructions) to pull the vehicle 100 over to the side of the road.

In the illustrated example of FIG. 2, the condition determination circuitry 104 detects a condition of the vehicle 100 and/or the trailer 102. For example, the condition determination circuitry 104 can detect an object in a projected path of the vehicle 100, disconnection of the trailer 102 from the vehicle 100, insufficient tension in safety chains of the trailer 102, instability and/or sway of the trailer 102, sharp turns of the vehicle 100, selection of a mode of operation via the user interface 134, etc. In some examples, the condition determination circuitry 104 detects the condition based on the vehicle sensor data obtained by the vehicle sensor interface circuitry 210, the trailer sensor data obtained by the trailer sensor interface circuitry 212, and/or the user input obtained by the user interface control circuitry 202.

In some examples, the condition determination circuitry 104 determines that an object is in a projected path of the vehicle 100 based on the first image data from the front camera 108A. For example, the condition determination circuitry 104 processes the first image data to identify and/or otherwise detect an object therein. In other examples, the condition determination circuitry 104 determines that the trailer 102 is disconnected from the vehicle 100 based on the second image data from the rear camera 108B and/or a measured tongue weight from the tongue weight sensor 104F. For example, the condition determination circuitry 104 processes the second image data to calculate a distance between the vehicle 100 and the trailer 102, and determines that the trailer 102 is disconnected when the calculated distance is greater than a threshold distance (e.g., 5 ft). Additionally or alternatively, the condition determination circuitry 104 determines that the trailer 102 is disconnected when the measured tongue weight is zero or below a threshold tongue weight (e.g., 1 lbs, 2 lbs, etc.).

In some such examples, in response to determining that the trailer 102 is disconnected from the vehicle 100, the condition determination circuitry 104 monitors tension of the safety chains between the trailer 102 and the vehicle 100. In some examples, the condition determination circuitry 104 determines that the tension is insufficient (e.g., less than a threshold tension) when the calculated distance is less than the threshold distance. In such examples, the threshold distance is based on a length of the safety chains. In other examples, the condition determination circuitry 104 determines, based on the second image data, an angle of the safety chains relative to a horizontal plane (e.g., the ground). In such examples, the condition determination circuitry 104 determines that the tension in the safety chains is insufficient in response to the angle not satisfying a threshold angle.

In some examples, the condition determination circuitry 104 detects instability and/or sway of the trailer 102 based on the rear camera 108B of the vehicle 100 and/or one or more of the trailer sensors 110 on the trailer 102. For example, the condition determination circuitry 104 can monitor the second image data from the rear camera 108B and detect and/or otherwise identify positions of the trailer 102 in frames of the second image data. In such examples, the condition determination circuitry 104 detects sway of the trailer 102 based on changes in the positions of the trailer 102 between subsequent ones of the frames. Additionally or alternatively, the condition determination circuitry 104 can detect sway based on camera image data from one or more trailer cameras on the trailer 102.

In some examples, instability of the trailer 102 can occur when the vehicle 100 traverses a turn and/or a curved portion in the road. In such examples, the condition determination circuitry 104 detects instability of the trailer 102 based on data from the yaw sensor, the wheel speed sensor, and/or the lateral acceleration sensor included in the trailer sensors 110. In some examples, the condition determination circuitry 104 detects a sharp turn by the vehicle 100 based on steering wheel data from the steering wheel sensor 108G. For example, the condition determination circuitry 104 determines a torque applied to the steering wheel and/or a steering wheel angle to which the operator turns the steering wheel. The condition determination circuitry 104 determines that the vehicle 100 is making a sharp turn in response to the torque applied satisfying a threshold torque and/or a rotation angle of the steering wheel angle satisfying a threshold steering wheel angle.

In the illustrated example of FIG. 2, the torque control circuitry 206 adjusts the first torque of the first motor 112 and/or the second torque of the second motor 114 based on the condition detected by the condition determination circuitry 104. For example, the torque control circuitry 206 enables torque vectoring of the first and second wheels 116, 118 by independently controlling the first torque and the second torque. In particular, the torque control circuitry 206 can adjustably control the magnitude and/or direction of the first torque and the second torque, where the first torque and the second torque can be the same or different in some examples. In some examples, the torque control circuitry 206 adjusts the first and second torque by varying a current to each of the first and second motors 112, 114.

In some examples, the torque control circuitry 206 controls the first and second motors 112, 114 to stabilize the trailer 102 when the condition determination circuitry 104 detects sway and/or instability of the trailer 102. In other examples, the torque control circuitry 206 controls the first and second motors 112, 114 to steer the trailer 102 around an obstacle and/or along a sharp turn of the vehicle 100. In some examples, when the condition determination circuitry 104 determines that the trailer 102 is disconnected from the vehicle 100, the torque control circuitry 206 causes the trailer 102 to follow the vehicle 100 while maintaining tension on safety chains between the vehicle 100 and the trailer 102. In some examples, the torque control circuitry 206 controls the first and second motors 112, 114 to cause the trailer 102 to perform a crab walk with the vehicle 100. In some examples, the torque applied to the first and second motors can be manually controlled by an operator of the vehicle 100. For example, paddle shifters on a steering wheel of the vehicle 100 can be manually toggled by the operator to individually control the torque of the first and second motors 112, 114. Additionally or alternatively, a knob communicatively coupled to the user interface 134 can be adjusted by the operator to active and/or otherwise control torque vectoring of the trailer 102.

In the illustrated example of FIG. 2, the brake control circuitry 208 adjusts the first brake 130 of the first wheel 116 and/or the second brake 132 of the second wheel 118 based on the condition detected by the condition determination circuitry 104. In some examples, the trailer 102 can be steered by the brake control circuitry 208 adjusting the first and second brakes 130, 132 instead of the torque control circuitry 206 controlling the first and second motors 112, 114. In other examples, both the brake control circuitry 208 and the torque control circuitry 206 are used to steer and/or stabilize the trailer 102 using the first and second brakes 130, 132 along with the first and second motors 112, 114.

In some examples, the trailer control circuitry 104 includes means for obtaining vehicle data. For example, the means for obtaining vehicle data may be implemented by the vehicle sensor interface circuitry 210. In some examples, the vehicle sensor interface circuitry 210 may be implemented by machine executable instructions such as that implemented by at least blocks 702, 710 of FIG. 7, blocks 802, 804, 814 of FIG. 8, blocks 902, 912 of FIG. 9, and/or blocks 1002, 1012 of FIG. 10, executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the vehicle sensor interface circuitry 210 is implemented by other hardware logic circuitry, hardware implemented state machines, and/or any other combination of hardware, software, and/or firmware. For example, the vehicle sensor interface circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the trailer control circuitry 104 includes means for obtaining trailer data. For example, the means for obtaining trailer data may be implemented by the trailer sensor interface circuitry 212. In some examples, the vehicle sensor interface circuitry 212 may be implemented by machine executable instructions such as that implemented by at least blocks 702, 710 of FIG. 7, and/or blocks 902, 912 of FIG. 9, executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the trailer sensor interface circuitry 212 is implemented by other hardware logic circuitry, hardware implemented state machines, and/or any other combination of hardware, software, and/or firmware. For example, the trailer sensor interface circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the trailer control circuitry 104 includes means for interfacing. For example, the means for interfacing may be implemented by the user interface control circuitry 202. In some examples, the user interface control circuitry 202 may be implemented by machine executable instructions such as that implemented by at least block 706 of FIG. 7, block 808 of FIG. 8, block 908 of FIG. 9, and/or block 1008 of FIG. 10, executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the user interface control circuitry 202 is implemented by other hardware logic circuitry, hardware implemented state machines, and/or any other combination of hardware, software, and/or firmware. For example, the user interface control circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the trailer control circuitry 104 includes means for determining a condition. For example, the means for determining a condition may be implemented by the condition determination circuitry 204. In some examples, the condition determination circuitry 204 may be implemented by machine executable instructions such as that implemented by at least block 704 of FIG. 7, 806 of FIG. 8, blocks 904, 906 of FIG. 9, and/or blocks 1004, 1006 of FIG. 10, executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the condition determination circuitry 204 is implemented by other hardware logic circuitry, hardware implemented state machines, and/or any other combination of hardware, software, and/or firmware. For example, the condition determination circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the trailer control circuitry 104 includes means for controlling torque. For example, the means for controlling torque may be implemented by the torque control circuitry 206. In some examples, the torque control circuitry 206 may be implemented by machine executable instructions such as that implemented by at least block 708 of FIG. 7, blocks 810, 812 of FIG. 8, block 910 of FIG. 9, and/or block 1010 of FIG. 10, executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the torque control circuitry 206 is implemented by other hardware logic circuitry, hardware implemented state machines, and/or any other combination of hardware, software, and/or firmware. For example, the torque control circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the trailer control circuitry 104 includes means for controlling brakes. For example, the means for controlling brakes may be implemented by the brake control circuitry 208. In some examples, the brake control circuitry 208 may be implemented by machine executable instructions such as that implemented by at least block 708 of FIG. 7, blocks 810, 812 of FIG. 8, block 910 of FIG. 9, and/or block 1010 of FIG. 10, executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the brake control circuitry 208 is implemented by other hardware logic circuitry, hardware implemented state machines, and/or any other combination of hardware, software, and/or firmware. For example, the brake control circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 3:
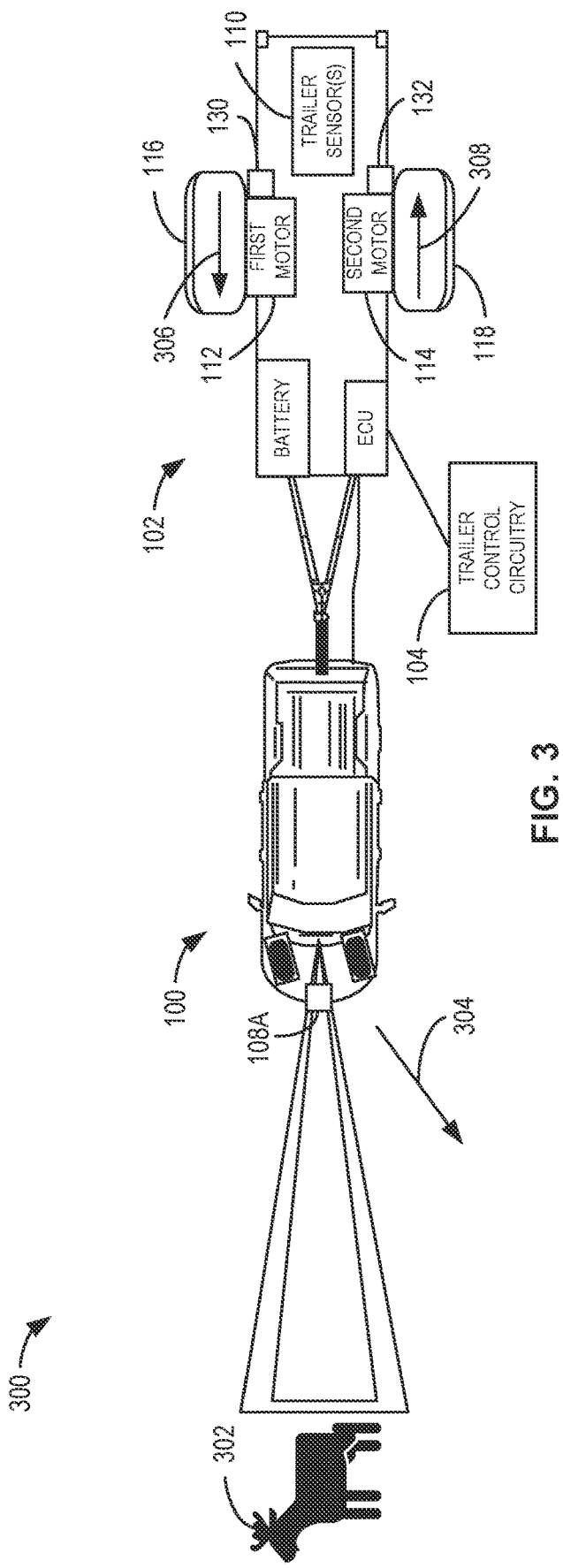
FIG. 3 illustrates the example vehicle and the example trailer of FIG. 1A, where an obstacle is in a projected path of the vehicle.

FIG. 3 illustrates a first example condition 300 of the vehicle 100 and the trailer 102, where an example obstacle (e.g., an object) 302 is in a projected path of the vehicle 100. In the illustrated example of FIG. 3, the trailer control circuitry 104 of FIGS. 1A and/or 2 detects the obstacle 302 using the front camera 108A on the vehicle 100. For example, the vehicle sensor interface circuitry 210 of FIG. 2 obtains (e.g., periodically and/or continually) the first image data from the front camera 108A. The condition determination circuitry 204 of FIG. 2 processes image frames from the first image data to identify objects in the image frames that are in the projected path of the vehicle 100. In some examples, the objects can include other vehicles, animals, pedestrians, road signs, etc. In this example, the condition determination circuitry 204 detects the obstacle 302 and determines a location and/or a distance of the obstacle 302 relative to the vehicle 100.

In response to the condition determination circuitry 204 determining that the obstacle 302 is in the projected path of the vehicle 100, the user interface control circuitry 202 displays a warning to the operator of the vehicle 100 and/or instructs the operator to steer the vehicle 100 away from the obstacle 302. In some examples, when the vehicle 100 is an autonomous vehicle, a control system of the vehicle 100 can automatically steer the vehicle 100 away from the obstacle 302 (e.g., without intervention by the operator).

In some examples, the torque control circuitry 206 of FIG. 2 controls the first and second motors 112, 114 to steer the trailer 102 with the vehicle 100 away from the obstacle 302. For example, the vehicle sensor interface circuitry 210 can monitor a steering wheel angle of the vehicle 100 using data from the steering wheel sensor 108G. In such examples, the torque control circuitry 206 determines an angle and/or a direction of the turn of the vehicle 100 based on the steering wheel data, and adjusts the torques of the first and second motors 112, 114 based on the angle and/or the direction of the turn.

In the illustrated example of FIG. 2, the vehicle 100 turns in an example leftward direction 304. In this example, to cause the trailer 102 to steer in the leftward direction 304, the torque control circuitry 206 adjusts the torques of the first and second motors 112, 114 to turn the wheels 116, 118 in opposite directions. For example, the torque control circuitry 206 adjusts the first torque of the first motor 112 in a forward direction 306 of the trailer 102, and adjusts the second torque of the second motor 114 in a rearward direction 308 of the trailer 102. In such examples, a differential between the first and second torques causes the trailer 102 to rotate in the leftward direction 304. By turning the trailer 102 with the vehicle 100, the torque control circuitry 206 enables the vehicle 100 and the trailer 102 to avoid contact with the obstacle 302.

Figure 4:
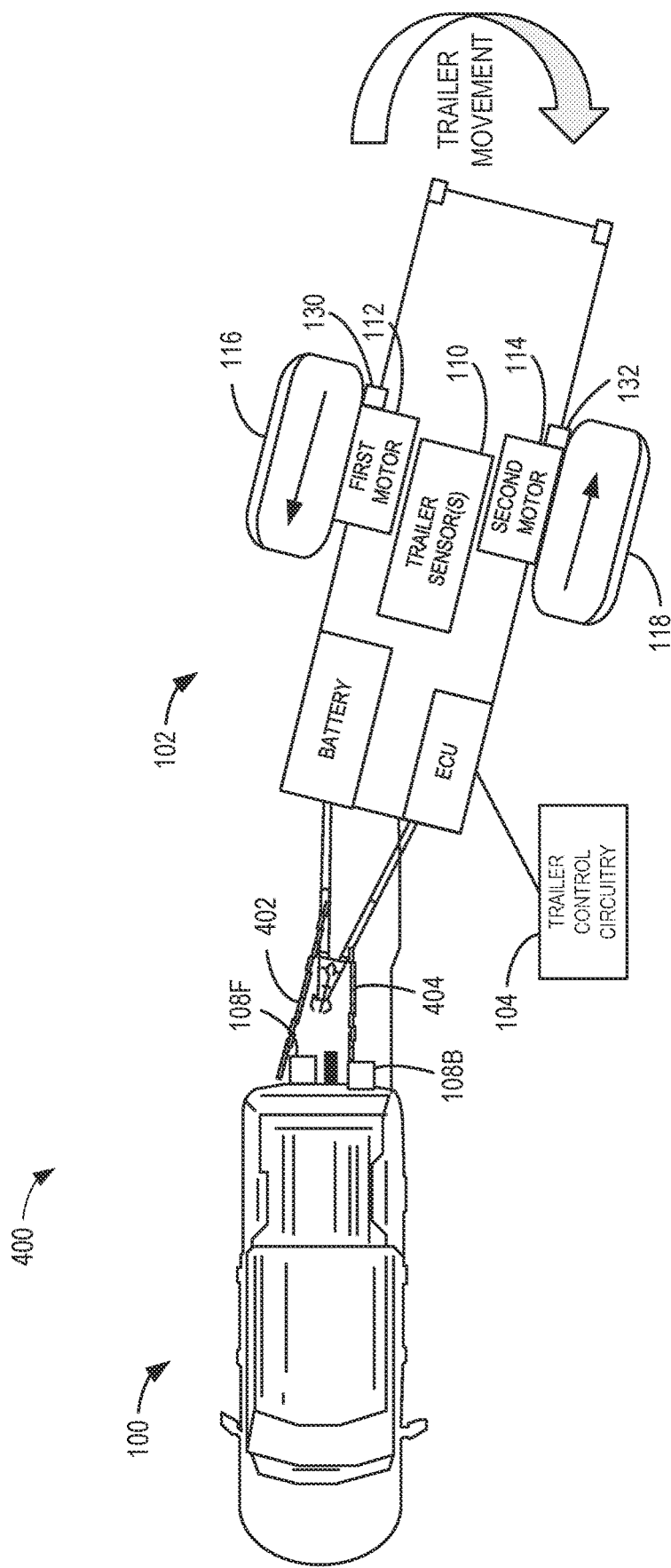
FIG. 4 illustrates the example vehicle and the example trailer of FIGS. 1A and/or 3, where the trailer is disconnected from the vehicle.

FIG. 4 illustrates a second example condition 400 of the vehicle 100 and the trailer 102, where the trailer 102 is disconnected from the tongue 122 of vehicle 100. In the illustrated example of FIG. 4, the trailer control circuitry 104 of FIGS. 1A and/or 2 detects that the trailer 102 is disconnected from an attachment point on the tongue 122 of the vehicle 100 based on sensor data from the vehicle sensor 108 and/or the trailer sensors 110. For example, the vehicle sensor interface circuitry 210 of FIG. 2 obtains image data from the rear camera 108B of the vehicle 100 and/or obtains tongue weight data from the tongue weight sensor 108F of FIG. 1A. In such examples, the condition determination circuitry 204 processes the image data to detect a distance between the trailer 102 and the vehicle 100, and determines that the trailer 102 is disconnected from the vehicle 100 in response to the distance being greater than a threshold distance. Additionally or alternatively, the condition determination circuitry 204 determines that the trailer 102 is disconnected in response to determining that the tongue weight of the trailer 102 on the vehicle 100 is zero. In some examples, the user interface control circuitry 202 displays an indication to the operator of the vehicle 100 that the trailer 102 is disconnected and/or instructs the operator to steer the vehicle 100 to a safe location (e.g., at the side of the road).

In the illustrated example of FIG. 4, the torque control circuitry 206 controls the first and second motors 112, 114 to cause the trailer 102 to follow the vehicle 100 to the side of the road. In such examples, the torque control circuitry 206 also monitors tension in example safety chains 402, 404 between the vehicle 100 and the trailer 102. In such examples, the torque control circuitry 206 monitors the tension based on image data from the rear camera 108B. In some examples, the torque control circuitry 206 adjusts the torques of the first and second motors 112, 114 to maintain sufficient tension on the safety chains 402, 404 and/or sufficient distance between the vehicle 100 and the trailer 102. Additionally or alternatively, the brake control circuitry 208 of FIG. 2 applies one or more of the brakes 130, 132 of the trailer 102 to maintain the tension on the safety chains 402, 404.

Figure 5:
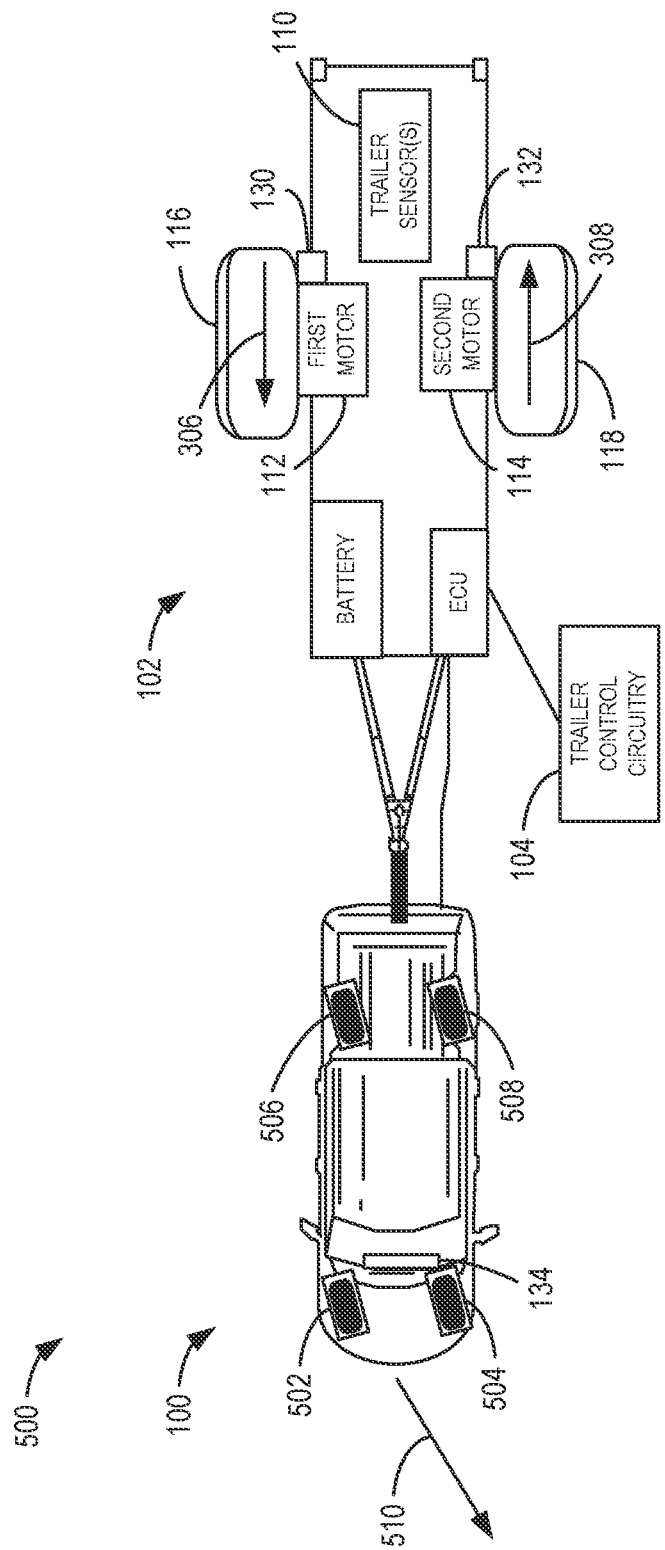
FIG. 5 illustrates the example vehicle and the example trailer of FIGS. 1A, 3, and/or 4, where the vehicle and the trailer are performing a crab walk.

FIG. 5 illustrates a third example condition 500 of the vehicle 100 and the trailer 102, where the trailer 102 and/or the vehicle 100 are to perform a crab walk. In some examples, a "crab walk" refers to a maneuver in which wheels of the vehicle 100 (e.g., including example front wheels 502, 504 and example rear wheels 506, 508) are individually and independently controlled to enable travel of the vehicle 100 in a diagonal direction 510. In the illustrated example of FIG. 5, an operator of the vehicle 100 can select and/or otherwise activate a crab walk mode of the vehicle 100 and/or the trailer 102 via the user interface 134.

In response to determining that the crab walk mode has been selected, the trailer control circuitry 104 adjusts and/or otherwise controls a first torque of the first motor 112 to cause the first wheel 116 of the trailer 102 to rotate in the forward direction 306, and adjusts the second torque of the second motor 114 to cause the second wheel 118 of the trailer 102 to rotate in the rearward direction 308. As such, the trailer control circuitry 104 causes the trailer 102 to travel in the diagonal direction 510 with the vehicle 100 in the crab walk mode.

Figure 6:
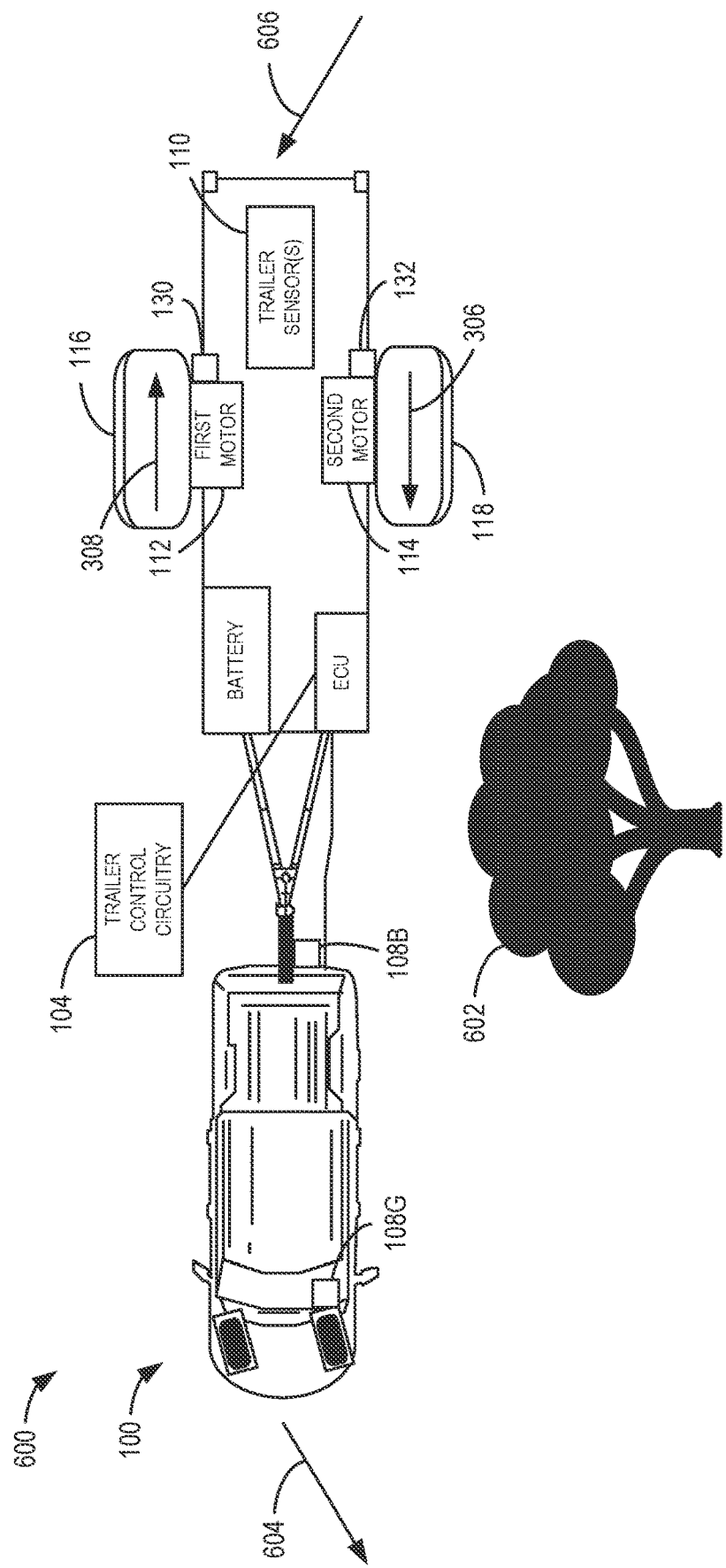
FIG. 6 illustrates the example vehicle and the example trailer of FIGS. 1A, 3, 4, and/or 5, where the vehicle and the trailer are steering around an object.

FIG. 6 illustrates a fourth example condition 600 of the vehicle 100 and the trailer 102, where the vehicle 100 and the trailer 102 are performing a sharp turn (e.g., a turn having a reduced turn radius) around an example object 602. In the illustrated example of FIG. 6, the trailer control circuitry 104 determines that the vehicle 100 is performing a sharp turn about the object 602 based on steering wheel data from the steering wheel sensor 108G. For example, the steering wheel data represents a torque applied by the operator on a steering wheel of the vehicle 100 and/or a direction of the applied torque. In some examples, the condition determination circuitry 204 of FIG. 2 monitors a position of the steering wheel based on the steering wheel data.

In response to the condition determination circuitry 204 determining that the vehicle 100 is performing a sharp turn (e.g., based on the operator turning the steering wheel fully to the left in this example), the torque control circuitry 206 adjusts the first torque of the first motor 112 and/or the second torque of the second motor 114 to reduce a turn radius of the trailer 102. In the illustrated example, while the vehicle 100 turns toward and/or substantially aligns with a first direction 604, the torque control circuitry 206 causes the trailer 102 to turn toward an example second direction 606 different from the first direction 604. In particular, the torque control circuitry 206 applies a first torque (e.g., a positive torque) to the first wheel 116 in the rearward direction 308 and applies a second torque (e.g., a negative torque) to the second wheel 118 in the forward direction 306, where the first wheel 116 is on an outside of the turn and the second wheel 118 is on an inside of the turn. Accordingly, the vehicle 100 rotates in a counterclockwise direction in FIG. 6, and the trailer 102 rotates in a clockwise direction of FIG. 6. In this example, the turn radius of the vehicle 100 and the trailer 102 is reduced, thus enabling the vehicle 100 and the trailer 102 to traverse a sharp turn around the object 602.

While an example manner of implementing the trailer control circuitry 104 of FIG. 1A is illustrated in FIG. 2, one or more of the elements, processes, and/or devices illustrated in FIG. 2 may be combined, divided, re-arranged, omitted, eliminated, and/or implemented in any other way. Further, the example user interface control circuitry 202, the example condition determination circuitry 204, the example torque control circuitry 206, the example brake control circuitry 208, the example vehicle sensor interface circuitry 210, the example trailer sensor interface circuitry 212, and/or, more generally, the example trailer control circuitry 104 of FIG. 2, may be implemented by hardware, software, firmware, and/or any combination of hardware, software, and/or firmware. Thus, for example, any of the example user interface control circuitry 202, the example condition determination circuitry 204, the example torque control circuitry 206, the example brake control circuitry 208, the example vehicle sensor interface circuitry 210, the example trailer sensor interface circuitry 212, and/or, more generally, the example trailer control circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example the example user interface control circuitry 202, the example condition determination circuitry 204, the example torque control circuitry 206, the example brake control circuitry 208, the example vehicle sensor interface circuitry 210, and/or the example trailer sensor interface circuitry 212 is/are hereby expressly defined to include a non-transitory computer readable storage device or storage disk such as a memory, a digital versatile disk (DVD), a compact disk (CD), a Blu-ray disk, etc., including the software and/or firmware. Further still, the example trailer control circuitry 104 of FIG. 1A may include one or more elements, processes, and/or devices in addition to, or instead of, those illustrated in FIG. 2, and/or may include more than one of any or all of the illustrated elements, processes and devices.

Flowcharts representative of example hardware logic circuitry, machine readable instructions, hardware implemented state machines, and/or any combination thereof for implementing the trailer control circuitry 104 of FIG. 2 are shown in FIGS. 7, 8, 9, and 10. The machine readable instructions may be one or more executable programs or portion(s) of an executable program for execution by processor circuitry, such as the processor circuitry 1112 shown in the example processor platform 1100 discussed below in connection with FIG. 11 and/or the example processor circuitry discussed below in connection with FIGS. 12 and/or 13. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowcharts illustrated in FIGS. 7, 8, 9, and/or 10, many other methods of implementing the example trailer control circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7, 8, 9, and/or 10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3)

at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Figure 7:
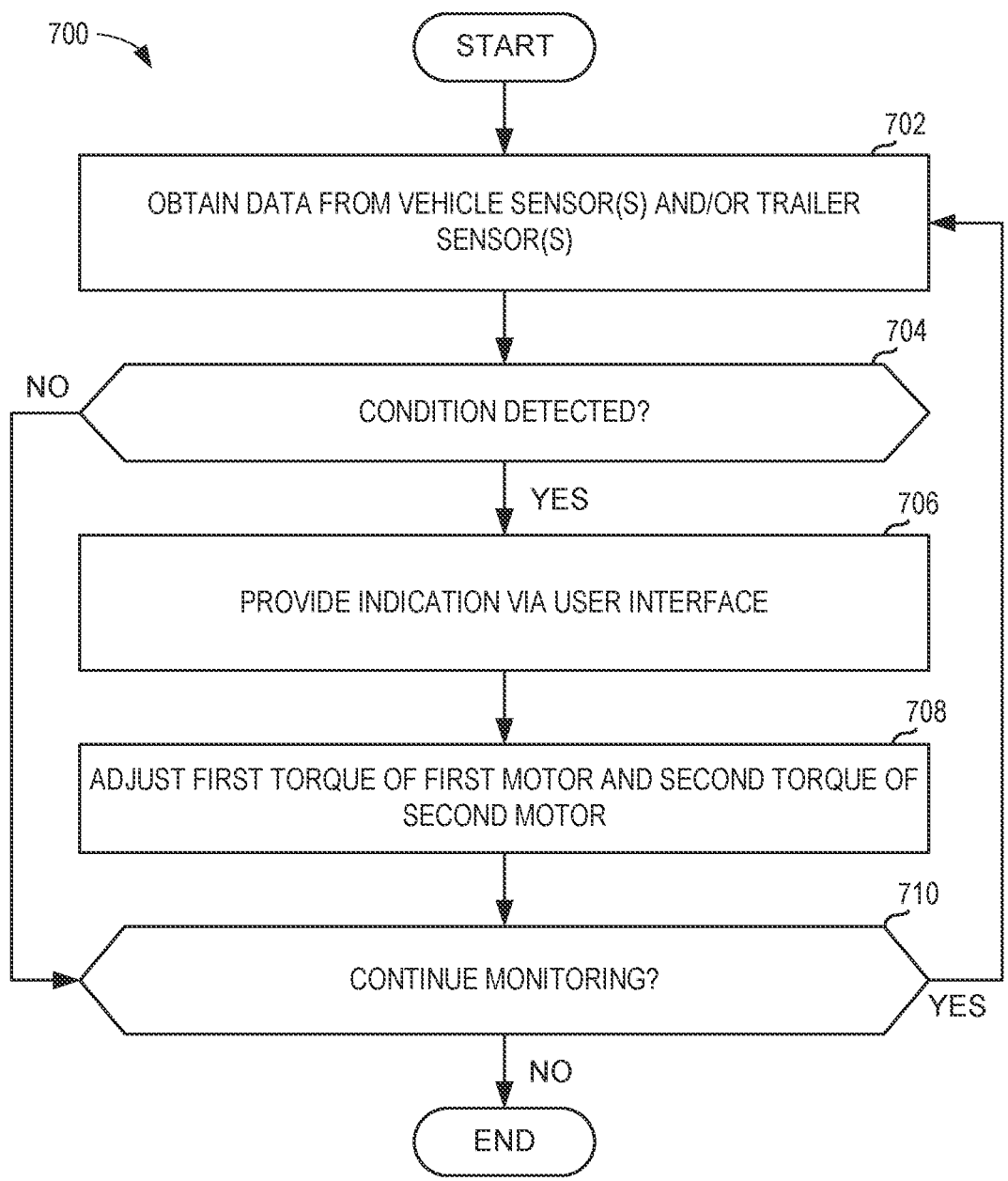
FIG. 7 is a flowchart representative of example machine readable instructions that may be executed by the example trailer control circuitry of FIG. 3 to control the example trailer of FIGS. 1A, 3, 4, 5, and/or 6 using torque vectoring.

FIG. 7 is a flowchart representative of example machine readable instructions and/or example operations 700 that may be executed and/or instantiated by the example trailer control circuitry 104 of FIGS. 1A and/or 2 to control the example trailer 102 of FIG. 1A using torque vectoring. The machine readable instructions and/or operations 700 of FIG. 7 begin at block 702, at which the example trailer control circuitry 104 obtains data from the example vehicle sensors 108 of FIG. 1A and/or the example trailer sensors 110 of FIG. 1A. For example, the example vehicle sensor interface circuitry 210 of FIG. 2 obtains vehicle sensor data from the vehicle sensors 108, where the vehicle sensor data can include first image data from the example front camera 108A, second image data from the example rear camera 108B, tongue weight data from the example tongue weight sensor 108F, etc. Additionally or alternatively, the example trailer sensor interface circuitry 212 obtains trailer sensor data from the trailer sensors 110, where the trailer sensor data can include third image data from a trailer camera of the trailer 102, a yaw angle of the trailer 102 relative to the example vehicle 100 of FIG. 1A, a yaw angle rate of the trailer 102, longitudinal and/or lateral acceleration of the trailer 102, etc.

At block 704, the example trailer control circuitry 104 detects whether a condition of the vehicle 100 and/or the trailer 102 is satisfied. For example, the example condition determination circuitry 204 of FIG. 2 detects the condition by evaluating the vehicle sensor data and/or the trailer sensor data, where the condition can include instability and/or sway of the trailer 102, an obstacle in a projected path of the vehicle 100, disconnection of the trailer 102 from the vehicle 100, a sharp turn of the vehicle 100, etc. In response to the condition determination circuitry 204 detecting that a condition is satisfied (e.g., block 704 returns a result of YES), control proceeds to block 706. Alternatively, in response to the condition determination circuitry 204 not detecting that a condition is satisfied (e.g., block 704 returns a result of NO), control proceeds to block 710.

At block 706, the example trailer control circuitry 104 provides, via the example user interface 134 of FIG. 1A, an indication to an operator of the vehicle 100. For example, the example user interface control circuitry 202 of FIG. 2 causes the user interface 134 to display the indication, where the indication indicates the detected condition. In some examples, the indication includes instructions to the operator (e.g., to pull the vehicle 100 to a side of the road).

At block 708, the example trailer control circuitry 104 adjusts a first torque of the first example motor 112 and/or a second torque of the second example motor 114 of FIG. 1A. For example, the example torque control circuitry 206 of FIG. 2 adjusts a direction and/or magnitude of the first and second torques based on the detected condition. In some examples, the example torque control circuitry 206 adjusts the first and second torques to cause the trailer 102 to follow the vehicle 100, steer the trailer 102 away from an obstacle, cause to the trailer 102 to perform a crab walk, reduce a turn radius of the trailer 102, etc. Additionally or alternatively, the example brake control circuitry 208 of FIG. 2 can control the first and second example brakes 130, 132 to steer and/or stabilize the trailer 102 based on the detected condition.

At block 710, the example trailer control circuitry 104 determines whether to continue monitoring. For example, the condition determination circuitry 204 determines whether to continue monitoring based on whether new vehicle sensor data and/or new trailer sensor data is obtained by the vehicle sensor interface circuitry 210 and/or the trailer sensor interface circuitry 212. In response to the condition determination circuitry 204 determining to continue monitoring (e.g., block 710 returns a result of YES), control returns to block 702. Alternatively, in response to the condition determination circuitry 204 determining not to continue monitoring (e.g., block 710 returns a result of NO), control ends.

Figure 8:
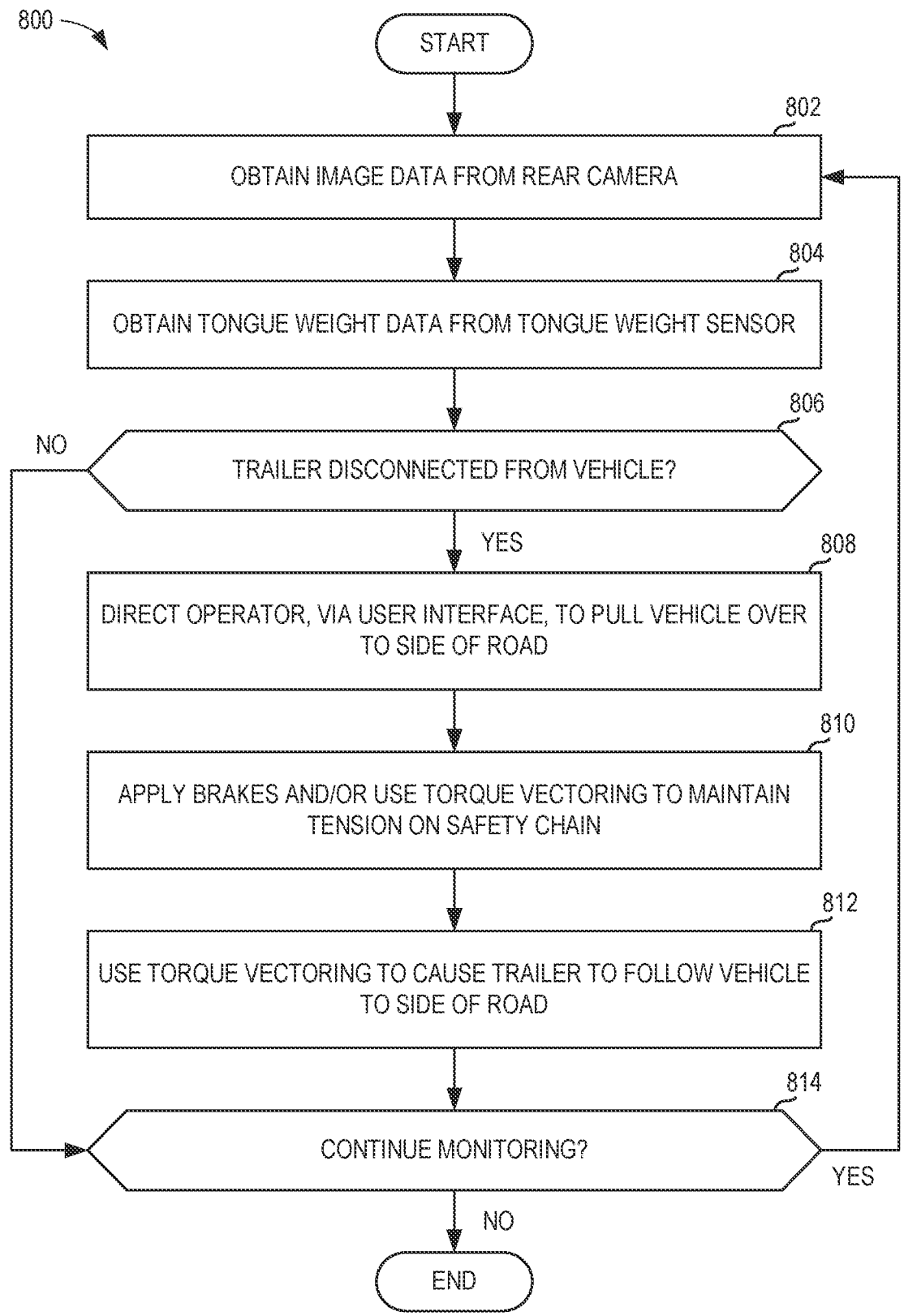
FIG. 8 is a flowchart representative of example machine readable instructions that may be executed by the example trailer control circuitry of FIG. 3 to control the example trailer of FIGS. 1A, 3, 4, 5, and/or 6 when the trailer is disconnected from the example vehicle.

FIG. 8 is a flowchart representative of example machine readable instructions and/or example operations 800 that may be executed and/or instantiated by the example trailer control circuitry 104 of FIGS. 1A and/or 2 to control the example trailer 102 of FIG. 1A when the trailer 102 is disconnection from the example vehicle 100 of FIG. 1A. The machine readable instructions and/or operations 800 of FIG. 8 begin at block 802, at which the example trailer control circuitry 104 obtains image data from the example rear camera 108B of the vehicle 100. For example, the example vehicle sensor interface circuitry 210 of FIG. 2 obtains the image data from the rear camera 108B, where the image data represents a location of the trailer 102 relative to the vehicle 100.

At block 804, the example trailer control circuitry 104 obtains tongue weight data from the example tongue weight sensor 108F of FIG. 1A. For example, the vehicle sensor interface circuitry 210 obtains the tongue weight data from the tongue weight sensor 108F, where the tongue weight data represents a load of the trailer 102 on the tongue 122 of the vehicle 100.

At block 806, the example trailer control circuitry 104 determines whether the trailer 102 is disconnected from the vehicle 100. For example, the example condition determination circuitry 204 of FIG. 2 determines whether the trailer 102 is disconnected based on the image data from the rear camera 108B and/or the tongue weight data from the tongue weight sensor. In some examples, the condition determination circuitry 204 calculates, based on the image data, a distance between the vehicle 100 and the trailer 102, and determines that the trailer 102 is disconnected in response to the distance being greater than a threshold distance. In other examples, the condition determination circuitry 204 determines that the trailer 102 is disconnected in response to the tongue weight data indicating that the load on the tongue 122 is zero. In response to the condition determination circuitry 204 determining that the trailer 102 is disconnected from the vehicle 100 (e.g., block 806 returns a result of YES), control proceeds to block 808. Alternatively, in response to the condition determination circuitry 204 determining that the trailer 102 is not disconnected from the vehicle 100 (e.g., block 806 returns a result of NO), control proceeds to block 814.

At block 808, the example trailer control circuitry 104 directs, via the example user interface 134 of FIG. 1A, the operator of the vehicle 100 to pull the vehicle 100 over to a side of the road. For example, the example user interface control circuitry 202 of FIG. 2 displays instructions on the user interface 134 instructing the operator to pull the vehicle 100 over.

At block 810, the example trailer control circuitry 104 applies the example brakes 130, 132 of FIG. 1A and/or uses torque vectoring of the example motors 112, 114 of FIG. 1A to maintain tension on the example safety chains 402, 404 between the vehicle 100 and the trailer 102. For example, the condition determination circuitry 204 monitors the tension based on the image data from the rear camera 108B, and the example torque control circuitry 206 of FIG. 2 adjusts the first torque of the first motor 112 and/or the second torque of the second motor 114 to maintain sufficient tension of the safety chains 402, 404. Additionally or alternatively, the example brake control circuitry 208 of FIG. 2 applies the first brake 130 and/or the second brake 130 of FIG. 1A to maintain the tension of the safety chains 402, 404.

At block 812, the example trailer control circuitry 104 uses torque vectoring of the example motors 112, 114 to cause the trailer 102 to follow the vehicle 100 to the side of the road. For example, the example torque control circuitry 206 adjusts the first torque of the first motor 112 and/or the second torque of the second motor 114 to steer the trailer 102 to follow the vehicle 100.

At block 814, the example trailer control circuitry 104 determines whether to continue monitoring. For example, the condition determination circuitry 204 determines whether to continue monitoring based on whether new data is obtained by the vehicle sensor interface circuitry 210. In response to the condition determination circuitry 204 determining to continue monitoring (e.g., block 814 returns a result of YES), control returns to block 802. Alternatively, in response to the condition determination circuitry 204 determining not to continue monitoring (e.g., block 814 returns a result of NO), control ends.

Figure 9:
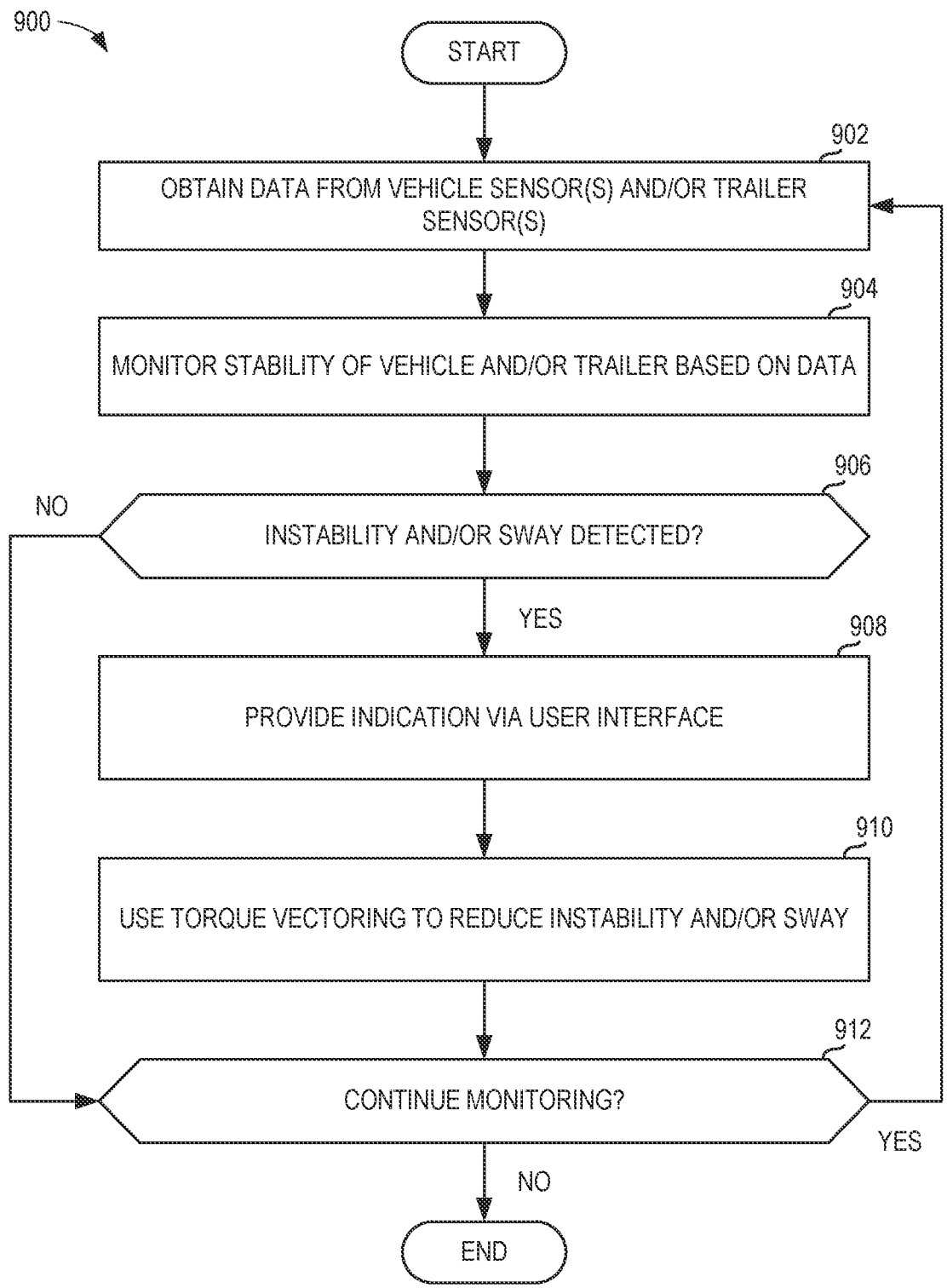
FIG. 9 is a flowchart representative of example machine readable instructions that may be executed by the example trailer control circuitry of FIG. 3 to control the example trailer of FIGS. 1A, 3, 4, 5, and/or 6 when the instability and/or sway is detected.

FIG. 9 is a flowchart representative of example machine readable instructions and/or example operations 900 that may be executed and/or instantiated by the example trailer control circuitry 104 of FIGS. 1A and/or 2 to control the example trailer 102 of FIG. 1A when instability and/or sway of the trailer 102 of FIG. 1A occurs. The machine readable instructions and/or operations 900 of FIG. 9 begin at block 902, at which the example trailer control circuitry 104 obtains data from one or more of the vehicle sensors 108 and/or one or more of the trailer sensors 110 of FIG. 1A. For example, the example vehicle sensor interface circuitry 210 of FIG. 2 obtains vehicle sensor data from the vehicle sensors 108 and the example trailer sensor interface circuitry 212 of FIG. 2 obtains trailer sensor data from the trailer sensors 110. In some examples, the vehicle sensor data includes vehicle camera data from the rear camera 108B of the vehicle 100. In some examples, the trailer sensor data includes trailer camera data from one or more trailer cameras, yaw angle and/or yaw angle rate from a yaw sensor of the trailer 102, lateral acceleration of the trailer 102, longitudinal acceleration of the trailer 102, etc.

At block 904, the example trailer control circuitry 104 monitors stability of the vehicle 100 and/or the trailer 102 based on the vehicle sensor data and/or the trailer sensor data. For example, the example condition determination circuitry 204 of FIG. 2 monitors the stability of the trailer 102 based on, for example, comparing the yaw angle rate to a yaw angle rate threshold and/or monitoring movement of the trailer 102 relative to the vehicle 100 based on the trailer camera data and/or the vehicle camera data.

At block 906, the example trailer control circuitry 104 determines whether the instability and/or sway of the trailer 102 is present. In response to the condition determination circuitry 204 detecting instability and/or sway of the trailer 102 (e.g., block 906 returns a result of YES), control proceeds to block 908. Alternatively, in response to the condition determination circuitry 204 not detecting instability and/or sway of the trailer 102 (e.g., block 906 returns a result of NO), control proceeds to block 912.

At block 908, the example trailer control circuitry 104 provides an indication to the operator of the vehicle 100 via the example user interface 134 of FIG. 1A. For example, the example user interface control circuitry 202 of FIG. 2 displays the indication on the user interface 134, where the indication indicates to the operator that instability and/or sway of the trailer 102 is detected.

At block 910, the example trailer control circuitry 104 uses torque vectoring of the example motors 112, 114 of FIG. 1A to reduce instability and/or sway of the trailer 102. For example, the example torque control circuitry 206 of FIG. 2 adjusts the first torque of the first motor 112 and/or the second torque of the second motor 114 to stabilize the trailer 102 and/or to reduce sway thereof.

At block 912, the example trailer control circuitry 104 determines whether to continue monitoring. For example, the condition determination circuitry 204 determines whether to continue monitoring based on whether new data is obtained by the vehicle sensor interface circuitry 210 and/or the trailer sensor interface circuitry 212. In response to the condition determination circuitry 204 determining to continue monitoring (e.g., block 912 returns a result of YES), control returns to block 902. Alternatively, in response to the condition determination circuitry 204 determining not to continue monitoring (e.g., block 912 returns a result of NO), control ends.

Figure 10:
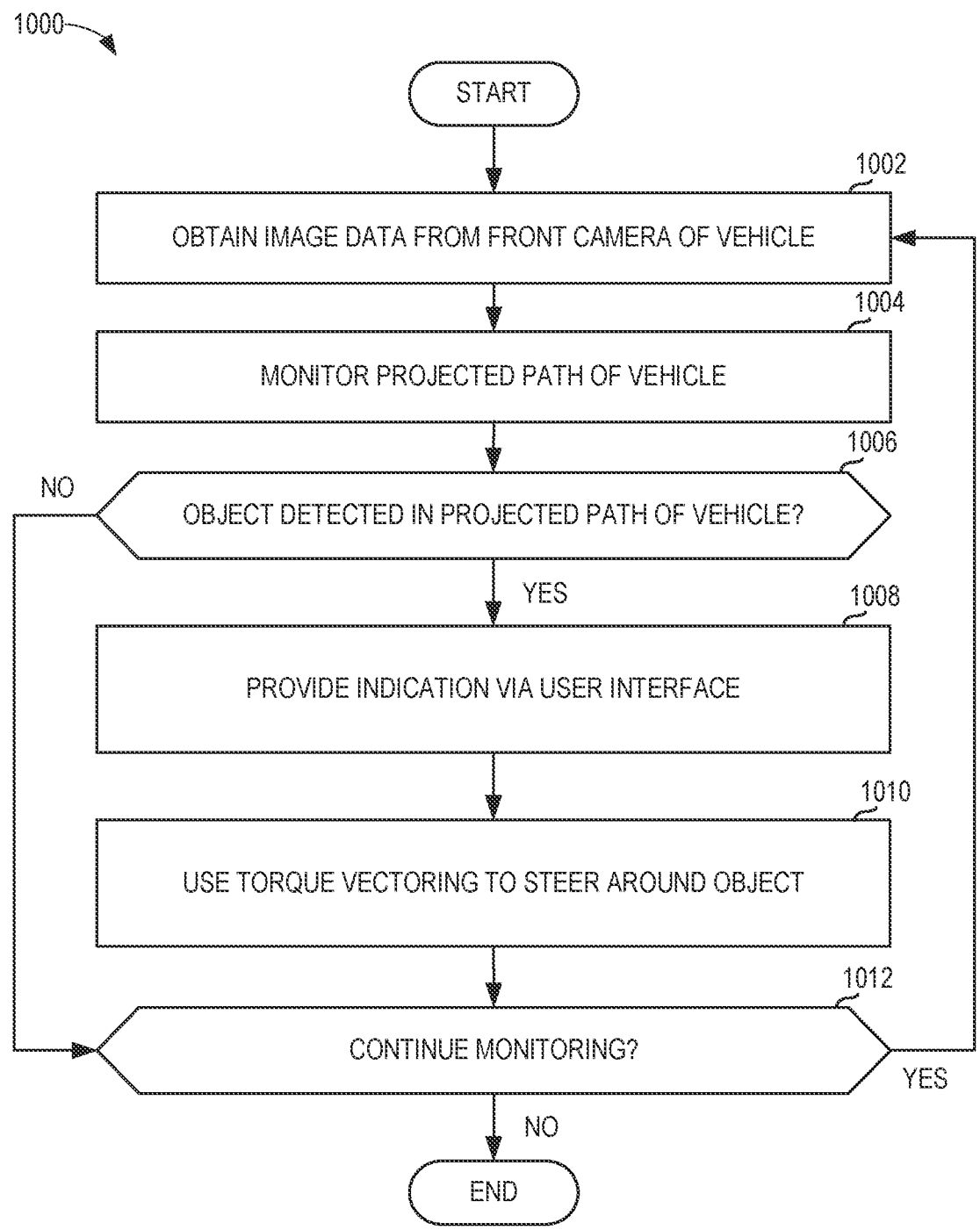
FIG. 10 is a flowchart representative of example machine readable instructions that may be executed by the example trailer control circuitry of FIG. 3 to control the example trailer of FIGS. 1A, 3, 4, 5, and/or 6 when an object is in a projected path of the example vehicle.

FIG. 10 is a flowchart representative of example machine readable instructions and/or example operations 1000 that may be executed and/or instantiated by the example trailer control circuitry 104 of FIGS. 1A and/or 2 to control the example trailer 102 of FIG. 1A when an object is in a projected path of the example vehicle 100 of FIG. 1A. The machine readable instructions and/or operations 1000 of FIG. 10 begin at block 1002, at which the example trailer control circuitry 104 obtains image data the example front camera 108A of the vehicle 100. For example, the example vehicle sensor interface circuitry 210 of FIG. 2 obtains the image data from the front camera 108A of FIG. 1A.

At block 1004, the example trailer control circuitry 104 monitors a projected path of the vehicle 100. For example, the example condition determination circuitry 204 of FIG. 2 processes the image data from the front camera 108A to identify and/or locate one or more objects in the projected path of the vehicle 100.

At block 1006, the example trailer control circuitry 104 determines whether an object is in the projected path of the vehicle 100. In response to the condition determination circuitry 204 detecting an object in the projected path of the vehicle 100 (e.g., block 1006 returns a result of YES), control proceeds to block 1008. Alternatively, in response to the condition determination circuitry 204 not detecting an object in the projected path of the vehicle 100 (e.g., block 1006 returns a result of NO), control proceeds to block 1012.

At block 1008, the example trailer control circuitry 104 provides an indication to the operator of the vehicle 100 via the example user interface 134 of FIG. 1A. For example, the example user interface control circuitry 202 of FIG. 2 displays the indication on the user interface 134, where the indication indicates to the operator that an object in the projected path of the vehicle 100 is detected. In some examples, the user interface control circuitry 202 instructs the operator, via the user interface 134, to swerve and/or steer the vehicle 100 around the detected object.

At block 1010, the example trailer control circuitry 104 uses torque vectoring of the example motors 112, 114 of FIG. 1A to steer the trailer 102 around the object. For example, the example torque control circuitry 206 of FIG. 2 adjusts the first torque of the first motor 112 and/or the second torque of the second motor 114 to steer the trailer 102 with the vehicle 100 to avoid a contact with the detected object.

At block 1012, the example trailer control circuitry 104 determines whether to continue monitoring. For example, the condition determination circuitry 204 determines whether to continue monitoring based on whether new data is obtained by the vehicle sensor interface circuitry 210. In response to the condition determination circuitry 204 determining to continue monitoring (e.g., block 1012 returns a result of YES), control returns to block 1002. Alternatively, in response to the condition determination circuitry 204 determining not to continue monitoring (e.g., block 1012 returns a result of NO), control ends.

FIG. 1A is a block diagram of an example processor platform 400 structured to execute and/or instantiate the machine readable instructions and/or operations of FIGS. 7, 8, 9, and/or 10 to implement the trailer control circuitry 104 of FIG. 2. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 412 implements the example user interface control circuitry 202, the example condition determination circuitry 204, the example torque control circuitry 206, the example brake control circuitry 208, the example vehicle sensor interface circuitry 210, and the example trailer sensor interface circuitry 212.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIGS. 7, 8, 9, and/or 10, may be stored in the mass storage device 1128, in the volatile memory 1114, in the non-volatile memory 1116, and/or on a removable non-transitory computer readable storage medium such as a CD or DVD.

Figure 11:
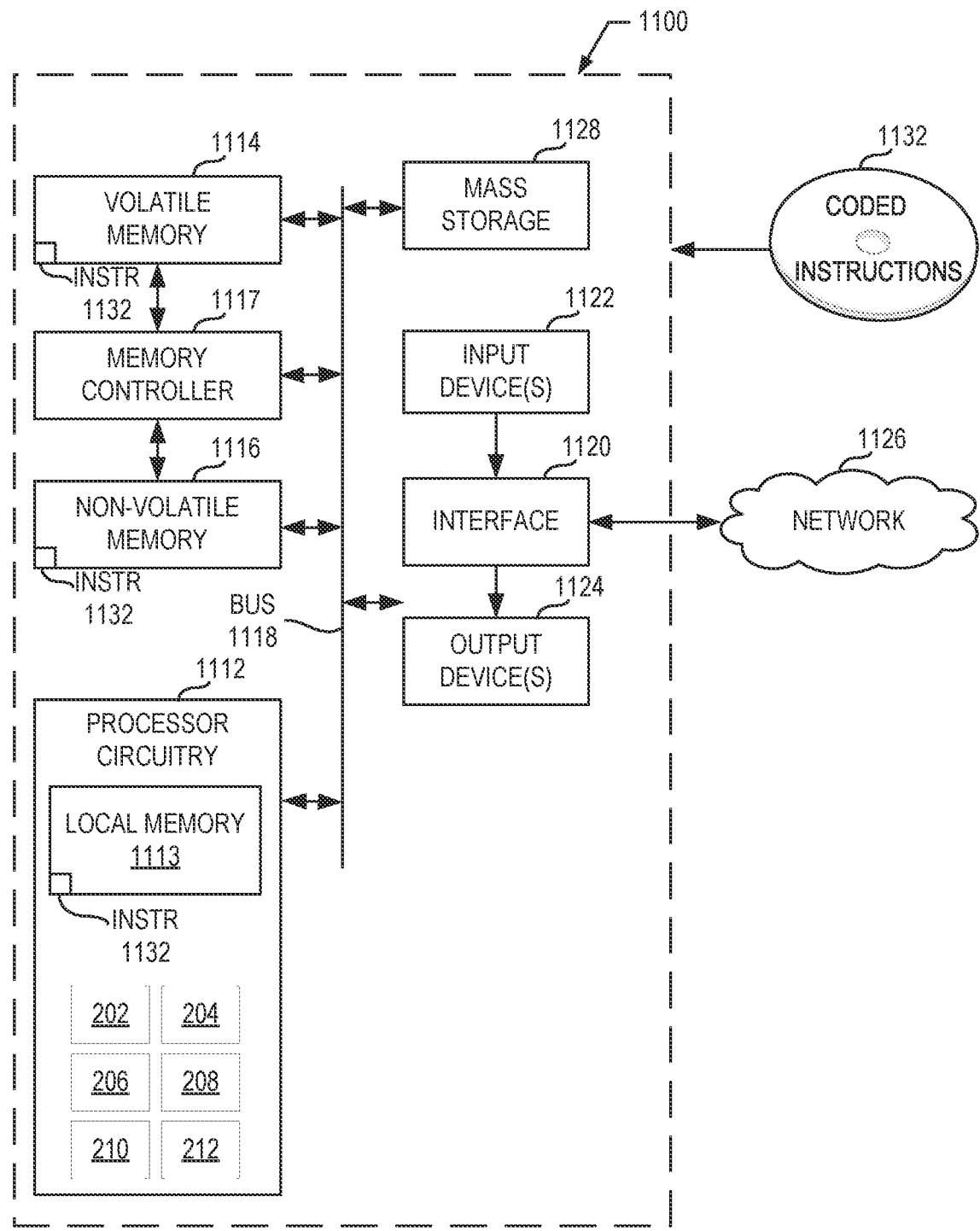
FIG. 11 is a block diagram of an example processing platform including processor circuitry structured to execute the example machine readable instructions of FIGS. 7, 8, 9, and/or 10 to implement the example trailer control circuitry of FIG. 3.
Figure 12:
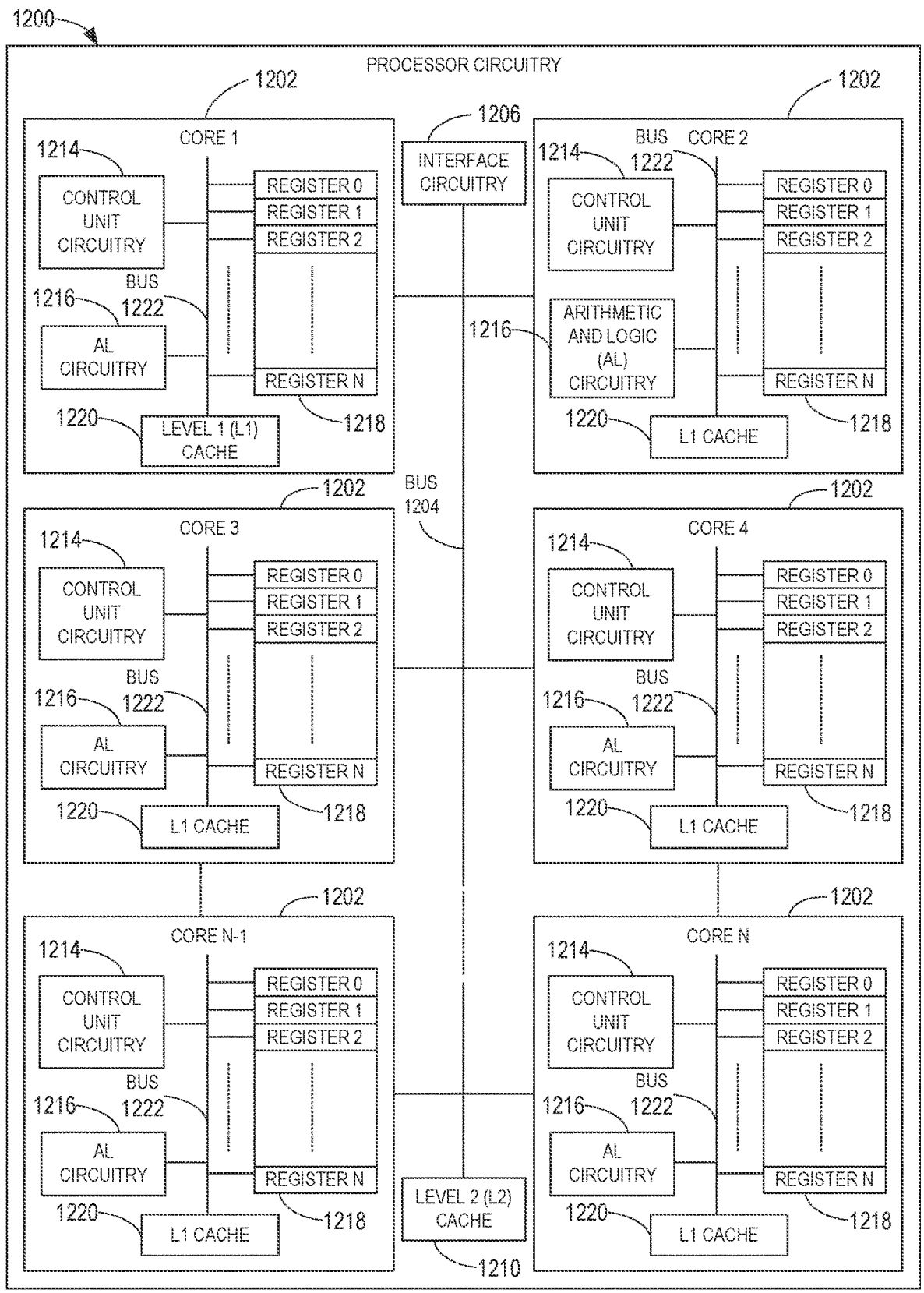
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowcharts of FIGS. 7, 8, 9, and/or 10.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
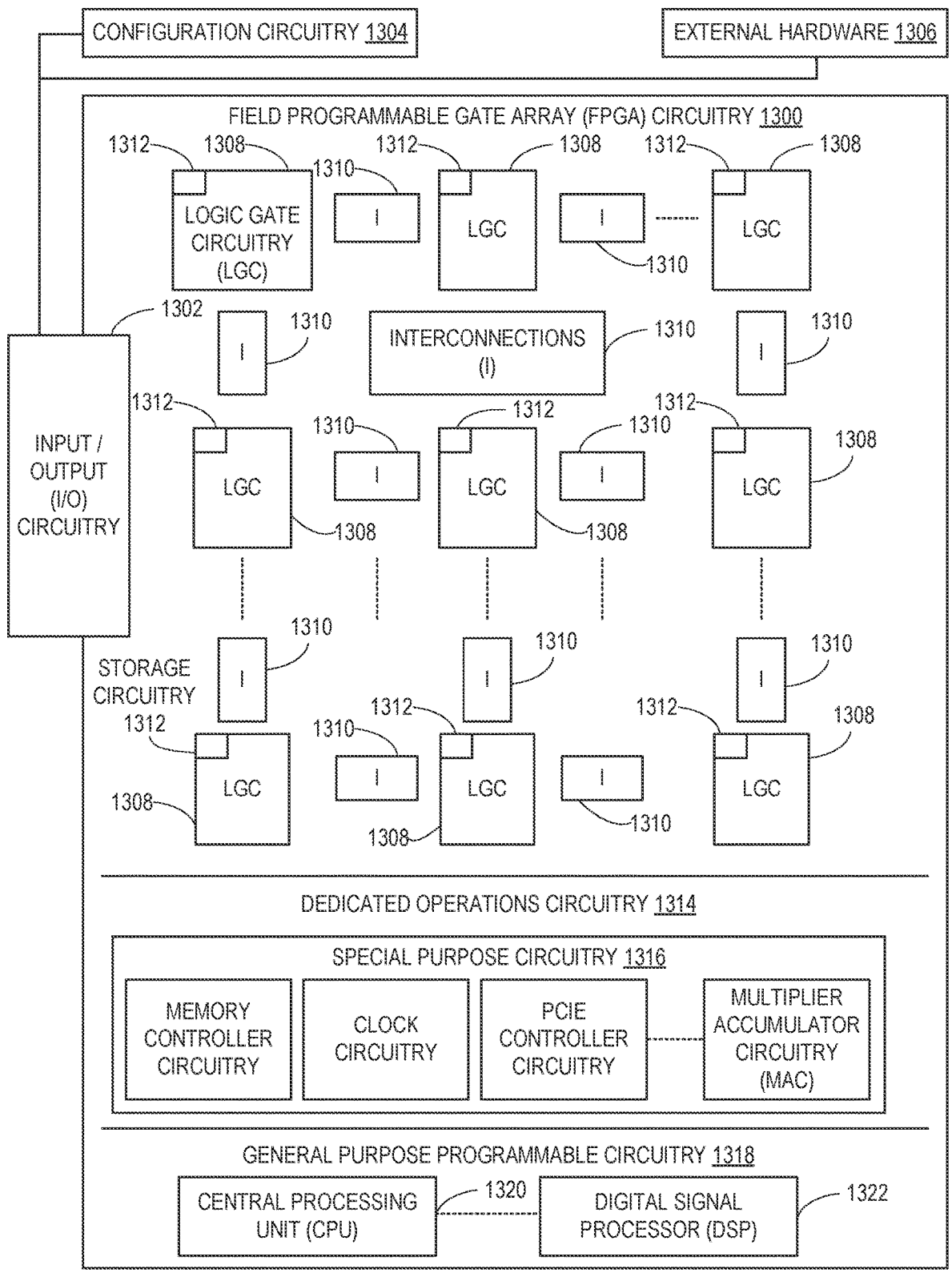
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowcharts of FIGS. 7, 8, 9, and/or 10 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowcharts of FIGS. 7, 8, 9, and/or 10. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowcharts of FIGS. 7, 8, 9, and/or 10. As such, the FPGA circuitry 1300 may be structured to effectively instantiate some or all of the machine readable instructions of the flowcharts of FIGS. 7, 8, 9, and/or 10 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIGS. 7, 8, 9, and/or 10 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIGS. 7, 8, 9, and/or 10 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an on-board CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowcharts of FIGS. 7, 8, 9, and/or 10 may be executed by one or more of the cores 1202 of FIG. 12 and a second portion of the machine readable instructions represented by the flowcharts of FIGS. 7, 8, 9, and/or 10 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that control a vehicle trailer using torque vectoring. Examples disclosed herein automatically detect, based on sensor data, a condition of a trailer and/or a vehicle (e.g., an object in a projected path of the vehicle, instability and/or sway of the trailer, disconnection of the trailer from the vehicle, etc.). Furthermore, example processor circuitry adjusts torque applied to motors of trailer wheels to steer the trailer using torque vectoring. The disclosed systems, methods, apparatus, and articles of manufacture improve the efficiency of using a computing device by reducing manual input required from the operator of the vehicle and by automatically detecting the condition of the trailer and/or the vehicle using sensor data, thus improving speed of activation of the trailer motors. Furthermore, examples disclosed herein vary the torque of the trailer motors based on sensor data continuously obtained and/or monitored by the processor circuitry, thus improving accuracy of steering of the trailer. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to control a vehicle trailer using torque vectoring are disclosed herein. Further examples and combinations thereof include the following:

Example 1 includes an apparatus to control a trailer of a vehicle, the apparatus comprising condition determination circuitry to determine, based on data from sensors on at least one of the trailer or the vehicle, whether a condition associated with the vehicle is satisfied, and torque control circuitry to adjust, in response to the condition being satisfied, a first torque of a first motor and a second torque of a second motor, the first motor operatively coupled to a first wheel of the trailer, the second motor operatively coupled to a second wheel of the trailer.

Example 2 includes the apparatus of example 1, wherein the torque control circuitry is to adjust the first torque in a first direction and adjust the second torque in a second direction, the first direction opposite the second direction.

Example 3 includes the apparatus of example 1, further including user interface control circuitry to display an indication to an operator of the vehicle in response to the condition determination circuitry determining that the condition is satisfied.

Example 4 includes the apparatus of example 1, further including vehicle sensor interface circuitry to obtain the data from at least one of a front camera, a rear camera, an ultrasonic sensor, a radar sensor, a lidar sensor, a blind spot information system (BLIS) sensor, or a load sensor of the vehicle.

Example 5 includes the apparatus of example 1, wherein the condition determination circuitry is to determine that the condition is satisfied in response to determining that the trailer is disconnected from the vehicle.

Example 6 includes the apparatus of example 5, wherein the condition determination circuitry is to determine that the trailer is disconnected from the vehicle based on image data from a camera of the vehicle.

Example 7 includes the apparatus of example 1, wherein the condition determination circuitry is to determine that the condition is satisfied in response to detecting, based on the data, an object in a projected path of the vehicle.

Example 8 includes a non-transitory computer readable medium comprising instructions that, when executed, cause processor circuitry to determine, based on data from sensors on at least one of a trailer or a vehicle, whether a condition associated with the vehicle is satisfied, and adjust, in response to the condition being satisfied, a first torque of a first motor and a second torque of a second motor, the first motor operatively coupled to a first wheel of the trailer, the second motor operatively coupled to a second wheel of the trailer.

Example 9 includes the non-transitory computer readable medium of example 8, wherein the instructions, when executed, cause the processor circuitry to adjust the first torque in a first direction and adjust the second torque in a second direction, the first direction opposite the second direction.

Example 10 includes the non-transitory computer readable medium of example 8, wherein the instructions, when executed, cause the processor circuitry to display an indication to an operator of the vehicle in response to determining that the condition is satisfied.

Example 11 includes the non-transitory computer readable medium of example 8, wherein the instructions, when executed, cause the processor circuitry to obtain the data from at least one of a front camera, a rear camera, an ultrasonic sensor, a radar sensor, a lidar sensor, a blind spot information system (BLIS) sensor, or a load sensor of the vehicle.

Example 12 includes the non-transitory computer readable medium of example 8, wherein the instructions, when executed, cause the processor circuitry to determine that the condition is satisfied in response to determining that the trailer is disconnected from the vehicle.

Example 13 includes the non-transitory computer readable medium of example 12, wherein the instructions, when executed, cause the processor circuitry to determine that the trailer is disconnected from the vehicle based on image data from a camera of the vehicle.

Example 14 includes the non-transitory computer readable medium of example 8, wherein the instructions, when executed, cause the processor circuitry to determine that the condition is satisfied in response to detecting, based on the data, an object in a projected path of the vehicle.

Example 15 includes an apparatus comprising memory, instructions, and processor circuitry to execute the instructions to determine, based on data from sensors on at least one of a trailer or a vehicle, whether a condition associated with the vehicle is satisfied, and adjust, in response to the condition being satisfied, a first torque of a first motor and a second torque of a second motor, the first motor operatively coupled to a first wheel of the trailer, the second motor operatively coupled to a second wheel of the trailer.

Example 16 includes the apparatus of example 15, wherein the processor circuitry is to execute the instructions to adjust the first torque in a first direction and adjust the second torque in a second direction, the first direction opposite the second direction.

Example 17 includes the apparatus of example 15, wherein the processor circuitry is to execute the instructions to display an indication to an operator of the vehicle in response to determining that the condition is satisfied.

Example 18 includes the apparatus of example 15, wherein the processor circuitry is to execute the instructions to obtain the data from at least one of a front camera, a rear camera, an ultrasonic sensor, a radar sensor, a lidar sensor, a blind spot information system (BLIS) sensor, or a load sensor of the vehicle.

Example 19 includes the apparatus of example 15, wherein the processor circuitry is to execute the instructions to determine that the condition is satisfied in response to determining that the trailer is disconnected from the vehicle.

Example 20 includes the apparatus of example 19, wherein the processor circuitry is to execute the instructions to determine that the trailer is disconnected from the vehicle based on image data from a camera of the vehicle.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to control a trailer of a vehicle, the apparatus comprising:
condition determination circuitry to determine, based on data from sensors on at least one of the trailer or the vehicle, whether a condition associated with the vehicle is satisfied;

user interface control circuitry to display an indication to an operator of the vehicle in response to the condition determination circuitry determining that the condition is satisfied; and torque control circuitry to adjust, in response to the condition being satisfied, a first torque of a first motor and a second torque of a second motor, the first motor operatively coupled to a first wheel of the trailer, the second motor operatively coupled to a second wheel of the trailer.

2. The apparatus of claim 1, wherein the torque control circuitry is to adjust the first torque in a first direction and adjust the second torque in a second direction, the first direction opposite the second direction.

3. The apparatus of claim 1, further including vehicle sensor interface circuitry to obtain the data from at least one of a front camera, a rear camera, an ultrasonic sensor, a radar sensor, a lidar sensor, a blind spot information system (BLIS) sensor, or a load sensor of the vehicle.

4. The apparatus of claim 1, wherein the condition determination circuitry is to determine that the condition is satisfied in response to determining that the trailer is disconnected from the vehicle.

5. The apparatus of claim 4, wherein the condition determination circuitry is to determine that the trailer is disconnected from the vehicle based on image data from a camera of the vehicle.

6. The apparatus of claim 1, wherein the condition determination circuitry is to determine that the condition is satisfied in response to detecting, based on the data, an object in a projected path of the vehicle.

7. A non-transient computer readable medium comprising instructions that, when executed, cause processor circuitry to:

determine, based on data from sensors on at least one of a trailer or a vehicle, that a condition associated with the vehicle is satisfied in response to determining that the trailer is disconnected from the vehicle; and adjust, in response to the condition being satisfied, a first torque of a first motor and a second torque of a second motor, the first motor operatively coupled to a first wheel of the trailer, the second motor operatively coupled to a second wheel of the trailer.

8. The non-transient computer readable medium of claim 7, wherein the instructions, when executed, cause the processor circuitry to adjust the first torque in a first direction and adjust the second torque in a second direction, the first direction opposite the second direction.

9. The non-transient computer readable medium of claim 7, wherein the instructions, when executed, cause the processor circuitry to display an indication to an operator of the vehicle in response to determining that the condition is satisfied.

10. The non-transient computer readable medium of claim 7, wherein the instructions, when executed, cause the processor circuitry to obtain the data from at least one of a front camera, a rear camera, an ultrasonic sensor, a radar sensor, a lidar sensor, a blind spot information system (BLIS) sensor, or a load sensor of the vehicle.

11. The non-transient computer readable medium of claim 7, wherein the instructions, when executed, cause the processor circuitry to determine that the trailer is disconnected from the vehicle based on image data from a camera of the vehicle.

12. The non-transient computer readable medium of claim 7, wherein the instructions, when executed, cause the processor circuitry to determine that the condition is satisfied in response to detecting, based on the data, an object in a projected path of the vehicle.

13. An apparatus comprising:

memory;

instructions; and processor circuitry to execute the instructions to:

determine, based on data from sensors on at least one of a trailer or a vehicle, whether a condition associated with the vehicle is satisfied;

display an indication to an operator of the vehicle in response to determining that the condition is satisfied; and adjust, in response to the condition being satisfied, a first torque of a first motor and a second torque of a second motor, the first motor operatively coupled to a first wheel of the trailer, the second motor operatively coupled to a second wheel of the trailer.

14. The apparatus of claim 13, wherein the processor circuitry is to execute the instructions to adjust the first torque in a first direction and adjust the second torque in a second direction, the first direction opposite the second direction.

15. The apparatus of claim 13, wherein the processor circuitry is to execute the instructions to obtain the data from at least one of a front camera, a rear camera, an ultrasonic sensor, a radar sensor, a lidar sensor, a blind spot information system (BLIS) sensor, or a load sensor of the vehicle.

16. The apparatus of claim 13, wherein the processor circuitry is to execute the instructions to determine that the condition is satisfied in response to determining that the trailer is disconnected from the vehicle.

17. The apparatus of claim 16, wherein the processor circuitry is to execute the instructions to determine that the trailer is disconnected from the vehicle based on image data from a camera of the vehicle.

* * * * *